US012695411B2

(12) United States Patent
Peterson et al.

(10) Patent No.: US 12,695,411 B2
(45) Date of Patent: Jul. 28, 2026

(54) STEP FLAPS FOR INTEGRATING PHOTOVOLTAIC SYSTEMS WITH ROOFING SHINGLES

(71) Applicant: GAF Energy LLC, Parsippany, NJ (US)

(72) Inventors: Nathan Peterson, Oakland, CA (US); Michael David Kuiper, Newark, CA (US); Gary Rossi, Pleasant Hill, CA (US); Charles Tony Zyph, Saratoga, CA (US); Jesus Robledo, Jr., San Jose, CA (US); Richard Perkins, San Jose, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 19/270,032

(22) Filed: Jul. 15, 2025

(65) Prior Publication Data
US 2026/0025095 A1 Jan. 22, 2026

Related U.S. Application Data

(60) Provisional application No. 63/673,415, filed on Jul. 19, 2024, provisional application No. 63/705,295, filed on Oct. 9, 2024.

(51) Int. Cl.
*H02S 20/25* (2014.01)
*E04D 1/18* (2006.01)
(Continued)

(52) U.S. Cl.
CPC ................ *H02S 20/25* (2014.12); *E04D 1/18* (2013.01); *E04D 1/20* (2013.01); *E04D 2001/3458* (2013.01)

(58) Field of Classification Search
CPC .................................................. H02S 20/00–26
(Continued)

(56) References Cited

U.S. PATENT DOCUMENTS

| | | | |
|---|---|---|---|
| 1,981,467 A | 11/1934 | Radtke | |
| 3,156,497 A | 11/1964 | Lessard | |

(Continued)

FOREIGN PATENT DOCUMENTS

| | | | |
|---|---|---|---|
| CA | 2829440 A | 5/2019 | |
| CH | 700095 A2 | 6/2010 | |

(Continued)

OTHER PUBLICATIONS

Sunflare, Procducts: "Sunflare Develops Prototype for New Residential Solar Shingles"; 2019 <<sunflaresolar.com/news/sunflare-develops-prototype-for-new-residential-solar-shingles> retrieved Feb. 2, 2021.

(Continued)

*Primary Examiner* — Bach T Dinh
(74) *Attorney, Agent, or Firm* — GREENBERG TRAURIG, LLP

(57) ABSTRACT

A system includes a plurality of photovoltaic modules, a plurality of step flaps, and a plurality of roofing shingles installed on a roof deck. Each of the step flaps includes a first layer and a second layer, with the first layer overlaying a portion of the second layer, and the first layer attached to at least a portion of an overlapping portion of the second layer within an attachment area. An end of each of the plurality of photovoltaic modules overlays a portion of a corresponding one of the plurality of step flaps. An end of a first roofing shingle overlays a first step flap. The second layer of a second step flap vertically above the first step flap overlays a headlap portion of the first roofing shingle.

18 Claims, 18 Drawing Sheets

(51) Int. Cl.
  *E04D 1/20* (2006.01)
  *E04D 1/34* (2006.01)
(58) Field of Classification Search
  USPC ................................................. 136/243–265
  See application file for complete search history.

(56) References Cited

U.S. PATENT DOCUMENTS

| | | | |
|---|---|---|---|
| 3,581,779 A | 6/1971 | Gilbert, Jr. | |
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 5,167,579 A | 12/1992 | Rotter | |
| 5,437,735 A | 8/1995 | Younan et al. | |
| 5,590,495 A | 1/1997 | Bressler et al. | |
| 5,642,596 A | 7/1997 | Waddington | |
| 6,008,450 A | 12/1999 | Ohtsuka et al. | |
| 6,033,270 A | 3/2000 | Stuart | |
| 6,046,399 A | 4/2000 | Kapner | |
| 6,201,180 B1 | 3/2001 | Meyer et al. | |
| 6,220,329 B1 | 4/2001 | King et al. | |
| 6,308,482 B1 | 10/2001 | Strait | |
| 6,320,114 B1 | 11/2001 | Kuechler | |
| 6,320,115 B1 | 11/2001 | Kataoka et al. | |
| 6,336,304 B1 | 1/2002 | Mimura et al. | |
| 6,341,454 B1 | 1/2002 | Koleoglou | |
| 6,407,329 B1 | 6/2002 | Iino et al. | |
| 6,576,830 B2 | 6/2003 | Nagao et al. | |
| 6,928,781 B2 | 8/2005 | Desbois et al. | |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Podirsky | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,601,754 B2 | 12/2013 | Jenkins et al. | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,776,455 B2 | 7/2014 | Azoulay | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jabos et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,032,672 B2 | 5/2015 | Livsey et al. | |
| 9,121,178 B2 | 9/2015 | Belt et al. | |
| 9,153,950 B2 | 10/2015 | Yamanaka et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rodrigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,412,890 B1 | 8/2016 | Meyers | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| 10,027,273 B2 | 7/2018 | West et al. | |
| 10,115,850 B2 | 10/2018 | Rodrigues et al. | |
| 10,128,660 B1 | 11/2018 | Apte et al. | |
| 10,156,075 B1 | 12/2018 | McDonough | |
| 10,187,005 B2 | 1/2019 | Rodrigues et al. | |
| 10,256,765 B2 | 4/2019 | Rodrigues et al. | |
| 10,284,136 B1 | 5/2019 | Mayfield et al. | |
| 10,454,408 B2 | 10/2019 | Livsey et al. | |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,579,028 B1 | 3/2020 | Jacob | |
| 10,784,813 B2 | 9/2020 | Kalkanoglu et al. | |
| D904,289 S | 12/2020 | Lance et al. | |
| 11,012,026 B2 | 5/2021 | Kalkanoglu et al. | |
| 11,085,187 B2 | 8/2021 | Grubka et al. | |
| 11,177,639 B1 | 11/2021 | Nguyen et al. | |
| 11,217,715 B2 | 1/2022 | Sharenko et al. | |
| 11,251,744 B1 | 2/2022 | Bunea et al. | |
| 11,258,399 B2 | 2/2022 | Kalkanoglu et al. | |
| 11,283,394 B2 | 3/2022 | Perkins et al. | |
| 11,309,828 B2 | 4/2022 | Sirski et al. | |
| 11,394,344 B2 | 7/2022 | Perkins et al. | |
| 11,424,379 B2 | 8/2022 | Sharenko et al. | |
| 11,431,280 B2 | 8/2022 | Liu et al. | |
| 11,431,281 B2 | 8/2022 | Perkins et al. | |
| 11,444,569 B2 | 9/2022 | Clemente et al. | |
| 11,454,027 B2 | 9/2022 | Kuiper et al. | |
| 11,459,757 B2 | 10/2022 | Nguyen et al. | |
| 11,486,144 B2 | 11/2022 | Bunea et al. | |
| 11,489,482 B2 | 11/2022 | Peterson et al. | |
| 11,496,088 B2 | 11/2022 | Sirski et al. | |
| 11,508,861 B1 | 11/2022 | Perkins et al. | |
| 11,512,480 B1 | 11/2022 | Achor et al. | |
| 11,527,665 B2 | 12/2022 | Boitnott | |
| 11,545,927 B2 | 1/2023 | Abra et al. | |
| 11,545,928 B2 | 1/2023 | Perkins et al. | |

(56) References Cited

U.S. PATENT DOCUMENTS

| | | | |
|---|---|---|---|
| 11,658,470 B2 | 5/2023 | Nguyen et al. | |
| 11,661,745 B2 | 5/2023 | Bunea et al. | |
| 11,689,149 B2 | 6/2023 | Clemente et al. | |
| 11,705,531 B2 | 7/2023 | Sharenko et al. | |
| 11,728,759 B2 | 8/2023 | Nguyen et al. | |
| 11,732,490 B2 | 8/2023 | Achor et al. | |
| 11,811,361 B1 | 11/2023 | Farhangi et al. | |
| 11,824,486 B2 | 11/2023 | Nguyen et al. | |
| 11,824,487 B2 | 11/2023 | Nguyen et al. | |
| 11,843,067 B2 | 12/2023 | Nguyen et al. | |
| 2002/0053360 A1 | 5/2002 | Kinoshita et al. | |
| 2002/0129849 A1 | 9/2002 | Heckeroth | |
| 2003/0101662 A1 | 6/2003 | Ullman | |
| 2003/0132265 A1 | 7/2003 | Villela et al. | |
| 2003/0217768 A1 | 11/2003 | Guha | |
| 2004/0000334 A1 | 1/2004 | Ressler | |
| 2005/0030187 A1 | 2/2005 | Peress et al. | |
| 2005/0115603 A1 | 6/2005 | Yoshida et al. | |
| 2005/0144870 A1 | 7/2005 | Dinwoodie | |
| 2005/0178428 A1 | 8/2005 | Laaly et al. | |
| 2005/0193673 A1 | 9/2005 | Rodrigues et al. | |
| 2006/0042683 A1 | 3/2006 | Gangemi | |
| 2006/0046084 A1 | 3/2006 | Yang et al. | |
| 2007/0074757 A1 | 4/2007 | Mellott et al. | |
| 2007/0181174 A1 | 8/2007 | Ressler | |
| 2007/0193618 A1 | 8/2007 | Bressler et al. | |
| 2007/0249194 A1 | 10/2007 | Liao | |
| 2007/0295385 A1 | 12/2007 | Sheats et al. | |
| 2008/0006323 A1 | 1/2008 | Kalkanoglu et al. | |
| 2008/0035140 A1 | 2/2008 | Placer et al. | |
| 2008/0078440 A1 | 4/2008 | Lim et al. | |
| 2008/0185748 A1 | 8/2008 | Kalkanoglu | |
| 2008/0271774 A1 | 11/2008 | Kalkanoglu et al. | |
| 2008/0289682 A1 | 11/2008 | Adriani et al. | |
| 2008/0302030 A1 | 12/2008 | Stancel et al. | |
| 2008/0315061 A1 | 12/2008 | Fath | |
| 2009/0000222 A1 | 1/2009 | Kalkanoglu et al. | |
| 2009/0014057 A1 | 1/2009 | Croft et al. | |
| 2009/0014058 A1 | 1/2009 | Croft et al. | |
| 2009/0019795 A1 | 1/2009 | Szacsvay et al. | |
| 2009/0044850 A1 | 2/2009 | Kimberley | |
| 2009/0114261 A1 | 5/2009 | Stancel et al. | |
| 2009/0133340 A1 | 5/2009 | Shiao et al. | |
| 2009/0159118 A1 | 6/2009 | Kalkanoglu et al. | |
| 2009/0178350 A1 | 7/2009 | Kalkanoglu et al. | |
| 2009/0229652 A1 | 9/2009 | Mapel et al. | |
| 2009/0275247 A1 | 11/2009 | Richter et al. | |
| 2010/0019580 A1 | 1/2010 | Croft et al. | |
| 2010/0095618 A1 | 4/2010 | Edison et al. | |
| 2010/0101634 A1 | 4/2010 | Frank et al. | |
| 2010/0116325 A1 | 5/2010 | Nikoonahad | |
| 2010/0131108 A1 | 5/2010 | Meyer | |
| 2010/0139184 A1 | 6/2010 | Williams et al. | |
| 2010/0146878 A1 | 6/2010 | Koch et al. | |
| 2010/0159221 A1 | 6/2010 | Kourtakis et al. | |
| 2010/0170169 A1 | 7/2010 | Railkar et al. | |
| 2010/0186798 A1 | 7/2010 | Tormen et al. | |
| 2010/0242381 A1 | 9/2010 | Jenkins | |
| 2010/0313499 A1 | 12/2010 | Gangemi | |
| 2010/0325976 A1 | 12/2010 | DeGenfelder et al. | |
| 2010/0326488 A1 | 12/2010 | Aue et al. | |
| 2010/0326501 A1 | 12/2010 | Zhao et al. | |
| 2011/0030761 A1 | 2/2011 | Kalkanoglu et al. | |
| 2011/0036386 A1 | 2/2011 | Browder | |
| 2011/0036389 A1 | 2/2011 | Hardikar et al. | |
| 2011/0048507 A1 | 3/2011 | Livsey et al. | |
| 2011/0058337 A1 | 3/2011 | Han et al. | |
| 2011/0061326 A1 | 3/2011 | Jenkins | |
| 2011/0100436 A1 | 5/2011 | Cleereman et al. | |
| 2011/0104488 A1 | 5/2011 | Muessig et al. | |
| 2011/0132427 A1 | 6/2011 | Kalkanoglu et al. | |
| 2011/0168238 A1 | 7/2011 | Metin et al. | |
| 2011/0239555 A1 | 10/2011 | Cook et al. | |
| 2011/0302859 A1 | 12/2011 | Crasnianski | |
| 2011/0314753 A1 | 12/2011 | Farmer et al. | |
| 2012/0034799 A1 | 2/2012 | Hunt | |
| 2012/0060434 A1 | 3/2012 | Jacobs | |
| 2012/0060902 A1 | 3/2012 | Drake | |
| 2012/0085392 A1 | 4/2012 | Albert et al. | |
| 2012/0137600 A1 | 6/2012 | Jenkins | |
| 2012/0176077 A1 | 7/2012 | Oh et al. | |
| 2012/0212065 A1 | 8/2012 | Cheng et al. | |
| 2012/0233940 A1 | 9/2012 | Perkins et al. | |
| 2012/0240490 A1 | 9/2012 | Gangemi | |
| 2012/0260977 A1 | 10/2012 | Stancel | |
| 2012/0266942 A1 | 10/2012 | Komatsu et al. | |
| 2012/0279150 A1 | 11/2012 | Pislkak et al. | |
| 2012/0282437 A1 | 11/2012 | Clark et al. | |
| 2012/0291848 A1 | 11/2012 | Sherman et al. | |
| 2013/0008499 A1 | 1/2013 | Verger et al. | |
| 2013/0014455 A1 | 1/2013 | Grieco | |
| 2013/0118558 A1 | 5/2013 | Sherman | |
| 2013/0193769 A1 | 8/2013 | Mehta et al. | |
| 2013/0247988 A1 | 9/2013 | Reese et al. | |
| 2013/0284267 A1 | 10/2013 | Plug et al. | |
| 2013/0306137 A1 | 11/2013 | Ko | |
| 2014/0090697 A1 | 4/2014 | Rodrigues et al. | |
| 2014/0150843 A1 | 6/2014 | Pearce et al. | |
| 2014/0173997 A1 | 6/2014 | Jenkins | |
| 2014/0179220 A1 | 6/2014 | Railkar et al. | |
| 2014/0182222 A1 | 7/2014 | Kalkanoglu et al. | |
| 2014/0208675 A1 | 7/2014 | Beerer et al. | |
| 2014/0254776 A1 | 9/2014 | O'Connor et al. | |
| 2014/0266289 A1 | 9/2014 | Della Sera et al. | |
| 2014/0311556 A1 | 10/2014 | Feng et al. | |
| 2014/0352760 A1 | 12/2014 | Haynes et al. | |
| 2014/0366464 A1 | 12/2014 | Rodrigues et al. | |
| 2015/0089895 A1 | 4/2015 | Leitch | |
| 2015/0162459 A1 | 6/2015 | Lu et al. | |
| 2015/0318427 A1* | 11/2015 | Keenihan | H02S 40/36 |
| | | | 438/80 |
| 2015/0340516 A1 | 11/2015 | Kim et al. | |
| 2015/0349173 A1 | 12/2015 | Morad et al. | |
| 2016/0105144 A1 | 4/2016 | Haynes et al. | |
| 2016/0142008 A1 | 5/2016 | Lopez et al. | |
| 2016/0254776 A1 | 9/2016 | Rodrigues et al. | |
| 2016/0276508 A1 | 9/2016 | Huang et al. | |
| 2016/0359451 A1 | 12/2016 | Mao et al. | |
| 2017/0159292 A1 | 6/2017 | Chihlas et al. | |
| 2017/0179319 A1 | 6/2017 | Yamashita et al. | |
| 2017/0179726 A1 | 6/2017 | Garrity et al. | |
| 2017/0237390 A1 | 8/2017 | Hudson et al. | |
| 2017/0331415 A1 | 11/2017 | Koppi et al. | |
| 2018/0094438 A1 | 4/2018 | Wu et al. | |
| 2018/0097472 A1 | 4/2018 | Anderson et al. | |
| 2018/0115275 A1 | 4/2018 | Flanigan et al. | |
| 2018/0254738 A1 | 9/2018 | Yang et al. | |
| 2018/0294765 A1 | 10/2018 | Friedrich et al. | |
| 2018/0351502 A1 | 12/2018 | Almy et al. | |
| 2018/0367089 A1 | 12/2018 | Stutterheim et al. | |
| 2019/0030867 A1 | 1/2019 | Sun et al. | |
| 2019/0081436 A1 | 3/2019 | Onodi et al. | |
| 2019/0123679 A1 | 4/2019 | Rodrigues et al. | |
| 2019/0253022 A1 | 8/2019 | Hardar et al. | |
| 2019/0305717 A1 | 10/2019 | Allen et al. | |
| 2020/0109320 A1 | 4/2020 | Jiang | |
| 2020/0144958 A1 | 5/2020 | Rodrigues et al. | |
| 2020/0220819 A1 | 7/2020 | Vu et al. | |
| 2020/0224419 A1 | 7/2020 | Boss et al. | |
| 2020/0343397 A1 | 10/2020 | Hem-Jensen | |
| 2021/0083619 A1 | 3/2021 | Hegedus | |
| 2021/0115223 A1 | 4/2021 | Bonekamp et al. | |
| 2021/0159353 A1 | 5/2021 | Li et al. | |
| 2021/0194411 A1* | 6/2021 | Atchley | H02S 30/00 |
| 2021/0301536 A1 | 9/2021 | Baggs et al. | |
| 2021/0343886 A1 | 11/2021 | Sharenko et al. | |
| 2022/0060141 A1 | 2/2022 | Felton | |
| 2022/0149213 A1 | 5/2022 | Mensink et al. | |

(56)                References Cited

U.S. PATENT DOCUMENTS

| | | | | |
|---|---|---|---|---|
| 2022/0173694 | A1* | 6/2022 | Wray | E04D 1/20 |
| 2024/0291427 | A1 | 8/2024 | Perkins et al. | |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 << facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

STEP FLAPS FOR INTEGRATING PHOTOVOLTAIC SYSTEMS WITH ROOFING SHINGLES

CROSS-REFERENCE TO RELATED APPLICATION

This application is a Section 111(a) application relating to and claiming the benefit of commonly owned, U.S. Provisional Patent Application Ser. No. 63/673,415, filed Jul. 19, 2024, entitled "STEP FLAPS FOR INTEGRATING PHOTOVOLTAIC SYSTEMS WITH ROOFING SHINGLES," and U.S. Provisional Patent Application Ser. No. 63/705, 295, filed Oct. 9, 2024, entitled "STEP FLAPS FOR INTEGRATING PHOTOVOLTAIC SYSTEMS WITH ROOFING SHINGLES," the contents of each of which is incorporated herein by reference in its entirety.

FIELD OF THE INVENTION

The present invention relates to photovoltaic systems and, more particularly, step flaps for integrating photovoltaic systems with roofing shingles.

BACKGROUND

Photovoltaic systems are installed on building roofs to generate electricity.

SUMMARY

In some embodiments, a system includes a plurality of photovoltaic modules installed on a roof deck; a plurality of step flaps installed on the roof deck, wherein each of the plurality of step flaps includes a first layer and a second layer, wherein the first layer overlays a portion of the second layer, and wherein the first layer is attached to at least a portion of an overlapping portion of the second layer within an attachment area, wherein an end of each of the plurality of photovoltaic modules overlays a portion of a corresponding one of the plurality of step flaps; and a plurality of roofing shingles, wherein each of the plurality of roofing shingles includes a headlap portion and a reveal portion, wherein an end of a first roofing shingle of the plurality of roofing shingles overlays a first one of the plurality of step flaps, and wherein the second layer of a second one of the plurality of step flaps vertically above the first one of the plurality of step flaps overlays the headlap portion of the first roofing shingle.

In some embodiments, at least one of the first layer and the second layer of each of the plurality of step flaps is composed of a polymer, and wherein the polymer is one or more of thermoplastic polyolefin (TPO), polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyimide, polyvinyl chloride (PVC), ethylene propylene diene monomer (EPDM) rubber, silicone rubber, and fluoropolymers.

In some embodiments, at least one of the first layer and the second layer of each of the plurality of step flaps is composed of a metal.

In some embodiments, at least one of the first layer and the second layer of each of the plurality of step flaps is composed of asphalt, recycled asphalt, or a non-asphaltic material.

In some embodiments, the first layer has a first edge, a second edge opposite the first edge, an upper edge extending from the first edge to the second edge, and a lower edge opposite the upper edge and extending from the first edge to the second edge, wherein the second layer has a first edge, a second edge opposite the first edge of the second layer, an upper edge extending from the first edge of the second layer to the second edge of the second layer, and a lower edge opposite the upper edge of the second layer and extending from the first edge of the second layer to the second edge of the second layer, wherein the lower edge of the first layer is offset from the lower edge of the second layer.

In some embodiments, the attachment area extends from a first location between the first edge of the second layer and the second edge of the second layer, a second location opposite the first location and between the first edge of the first edge of the second layer and the second edge of the second layer, a third location between the upper edge of the second layer and lower edge of the second layer, and a fourth location opposite the third location and between the upper edge of the second layer and the lower edge of the second layer, and wherein the fourth location is proximate to the lower edge of the first layer.

In some embodiments, the first layer is attached to the second layer by an adhesive, adhesive strip, dots, tape, welding, heat welding, ultrasonic welding, thermal bonding, or a mechanical fastener.

In some embodiments, the first layer of each of the plurality of step flaps includes at least two alignment marks configured to assist in aligning the plurality of photovoltaic modules and the plurality of roofing shingles with the plurality of step flaps.

In some embodiments, the attachment area is between the at least two alignment marks.

In some embodiments, the second layer of each of the plurality of step flaps includes at least two alignment marks configured to assist in aligning the plurality of photovoltaic modules and the plurality of roofing shingles with the plurality of step flaps.

In some embodiments, each of the plurality of step flaps has a first width defined as a first distance from the first edge of the second layer of the step flap to a first one of the at least two alignment marks, and a second width defined as a second distance from the second edge of the second layer of the step flap to a second one of the at least two alignment marks, and wherein the first width and the second width are symmetrical.

In some embodiments, each of the plurality of step flaps includes a removable release liner between the first layer and the second layer.

In some embodiments, each of the plurality of step flaps includes a third layer, wherein the third layer overlays a portion of the second layer, and wherein the second layer is attached to at least a portion of an overlapping portion of the third layer at a second attachment area In some embodiments, each of the plurality of roofing shingles is an asphalt shingle, a recycled asphalt shingle, a polymer shingle, metal shingle, a non-asphaltic shingle, and an electrically inactive solar shingle.

In some embodiments, the second layer of the second one of the plurality of step flaps does not overlay the reveal portion of the first roofing shingle.

In some embodiments, the first layer or the second layer of each of the plurality of step flaps includes a fire retardant additive.

In some embodiments, the plurality of photovoltaic modules is arranged in an array including one or more subarrays, each subarray including a plurality of rows of photovoltaic modules.

In some embodiments, at least one of the first layer or the second layer of each of the plurality of step flaps has a thickness of 0.1 mm to 5 mm.

In some embodiments, a step flap includes a first layer having a first edge, a second edge opposite the first edge, an upper edge extending from the first edge to the second edge, and a lower edge opposite the upper edge and extending from the first edge to the second edge, and a second layer having a first edge, a second edge opposite the first edge of the second layer, an upper edge extending from the first edge of the second layer to the second edge of the second layer, and a lower edge opposite the upper edge of the second layer and extending from the first edge of the second layer to the second edge of the second layer, wherein the first layer overlays a portion of the second layer, wherein the first layer is attached to at least a portion of an overlapping portion of the second layer within an attachment area, wherein the attachment area extends from a first location between the first edge of the second layer and the second edge of the second layer, a second location opposite the first location and between the first edge of the first edge of the second layer and the second edge of the second layer, a third location between the upper edge of the second layer and lower edge of the second layer, and a fourth location opposite the third location and between the upper edge of the second layer and the lower edge of the second layer, and wherein the fourth location is proximate the lower edge of the first layer.

In some embodiments, a method includes installing a plurality of step flaps on a roof deck, wherein each of the plurality of step flaps includes a first layer and a second layer, the first layer overlaying and being attached to at least a portion of the second layer; installing a plurality of photovoltaic modules on the roof deck, wherein an end of each of the plurality of photovoltaic modules overlays a portion of a corresponding one of the plurality of step flaps; and installing a plurality of roofing shingles on the roof deck, wherein each of the plurality of roofing shingles includes a headlap portion and a reveal portion, wherein an end of a first roofing shingle of the plurality of roofing shingles overlays a first step flap of the plurality of step flaps, wherein the installing a plurality of step flaps includes installing a second step flap of the plurality of step flaps vertically above the first step flap such that the second layer of the second step flap overlays the headlap portion of the first roofing shingle but does not overlay the reveal portion of the first roofing shingle.

DETAILED DESCRIPTION

Figures 1A, 1B:
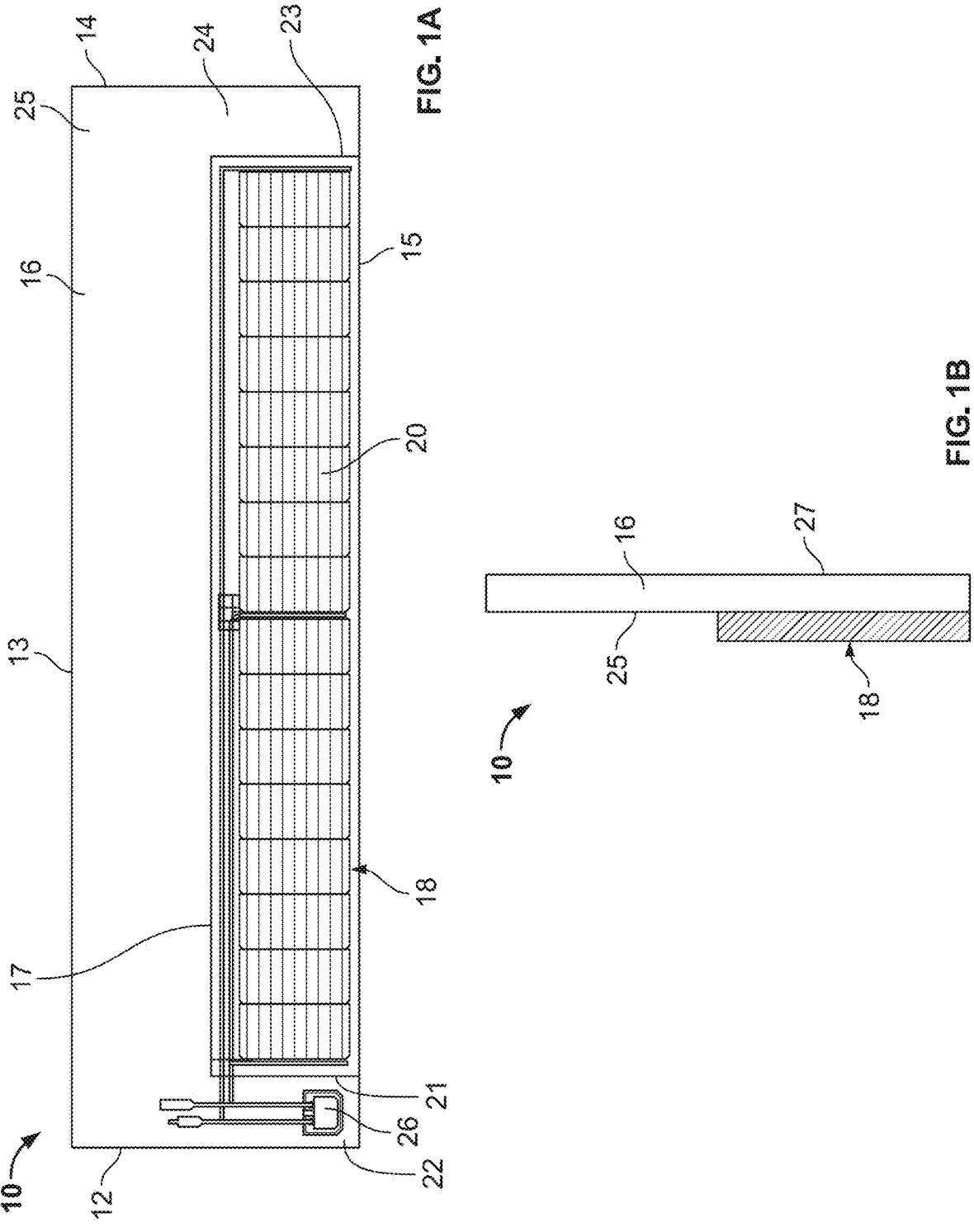
FIGS. 1A and 1B are a top plan view and a side elevational view, respectively, of some embodiments of a photovoltaic module.

Referring to FIGS. 1A and 1B, in some embodiments, a photovoltaic module 10 includes a first end 12, a second end 14 opposite the first end 12, a first edge 13 extending from the first end 12 to the second end 14, and a second edge 15 opposite the first edge 13 and extending from the first end 12 to the second end 14. In some embodiments, the photovoltaic module 10 includes a headlap portion 16. In some embodiments, the headlap portion 16 extends from the first end 12 to the second end 14 and from the first edge 13 to a first location 17 between the first edge 13 and the second edge 15. In some embodiments, the photovoltaic module 10 includes a reveal portion 18. In some embodiments, the reveal portion 18 includes at least one solar cell 20. In some embodiments, the photovoltaic module 10 includes a first side lap 22 located at the first end 12. In some embodiments, the first side lap 22 includes a length extending from the first end 12 to a second location 21 between the first end 12 and the second end 14. In some embodiments, the photovoltaic module 10 includes a second side lap 24 located at the second end 14. In some embodiments, the second side lap 24 includes a length extending from the second end 14 to a third location 23 between the first end 12 and the second end 14. In some embodiments, the photovoltaic module 10 includes an outer surface 25 and an inner surface 27 opposite the outer surface 25. In some embodiments, the reveal portion 18 extends from the first side lap 22 to the second side lap 24 and from the second edge 15 to the first location 17. In some embodiments, the photovoltaic module 10 is configured to be installed on a building structure. In some embodiments, at least one junction box 26 is located on the first side lap 22. In some embodiments, the at least one junction box 26 includes a plurality of the junction boxes 26. In some embodiments, the photovoltaic module 10 includes a structure, composition, components, and/or function similar to those of one or more embodiments of the photovoltaic modules disclosed in U.S. Pat. No. 11,870,227, issued Jan. 9, 2024, entitled "Building Integrated Photovoltaic System," owned by GAF Energy LLC, and U.S. Pat. No. 11,251,744 to Bunea et al., issued Feb. 15, 2022, entitled "Photovoltaic Shingles and Methods of Installing Same," owned by GAF Energy LLC, the contents of each of which are incorporated by reference herein in their entirety.

In some embodiments, the at least one solar cell 20 includes a plurality of the solar cells 20. In some embodiments, the plurality of solar cells 20 includes two solar cells. In some embodiments, the plurality of solar cells 20 includes three solar cells. In some embodiments, the plurality of solar cells 20 includes four solar cells. In some embodiments, the plurality of solar cells 20 includes five solar cells. In some embodiments, the plurality of solar cells 20 includes six solar cells. In some embodiments, the plurality of solar cells 20 includes seven solar cells. In some embodiments, the plurality of solar cells 20 includes eight solar cells. In some embodiments, the plurality of solar cells 20 includes nine solar cells. In some embodiments, the plurality of solar cells 20 includes ten solar cells. In some embodiments, the plurality of solar cells 20 includes eleven solar cells. In some embodiments, the plurality of solar cells 20 includes twelve solar cells. In some embodiments, the plurality of solar cells 20 includes thirteen solar cells. In some embodiments, the plurality of solar cells 20 includes fourteen solar cells. In some embodiments, the plurality of solar cells 20 includes fifteen solar cells. In some embodiments, the plurality of solar cells 20 includes sixteen solar cells. In some embodiments, the plurality of solar cells 20 includes more than sixteen solar cells.

In some embodiments, the plurality of solar cells 20 is arranged in one row (i.e., one reveal). In another embodiment, the plurality of solar cells 20 is arranged in two rows (i.e., two reveals). In another embodiment, the plurality of solar cells 20 is arranged in three rows (i.e., three reveals). In another embodiment, the plurality of solar cells 20 is arranged in four rows (i.e., four reveals). In another embodiment, the plurality of solar cells 20 is arranged in five rows (i.e., five reveals). In another embodiment, the plurality of solar cells 20 is arranged in six rows (i.e., six reveals). In other embodiments, the plurality of solar cells 20 is arranged in more than six rows. In some embodiments, the at least one solar cell 20 is electrically inactive (i.e., a "dummy" solar cell).

Figure 2:
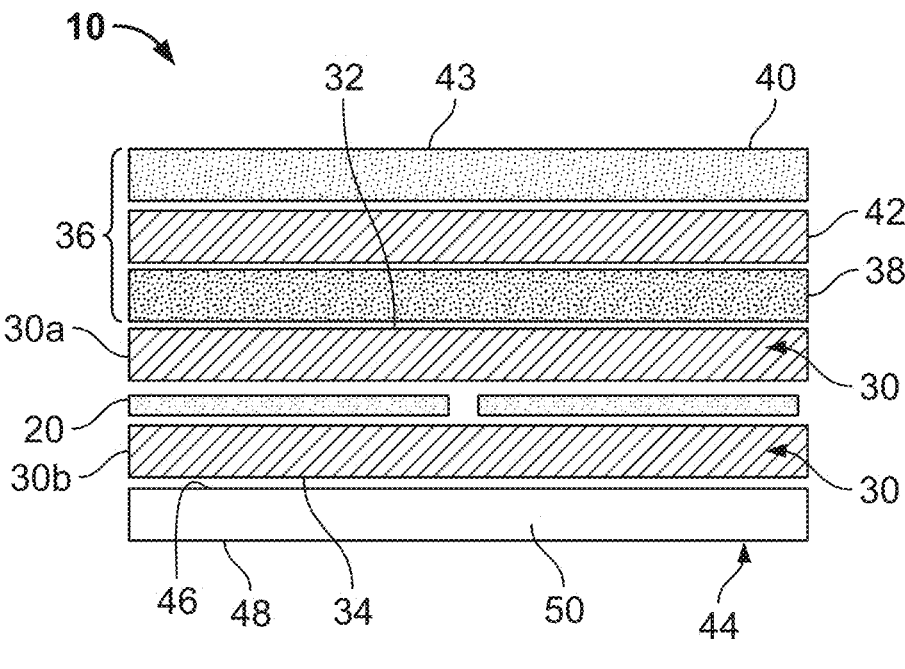
FIGS. 2 and 3 are schematic views of some embodiments of a photovoltaic module.
Figure 3:
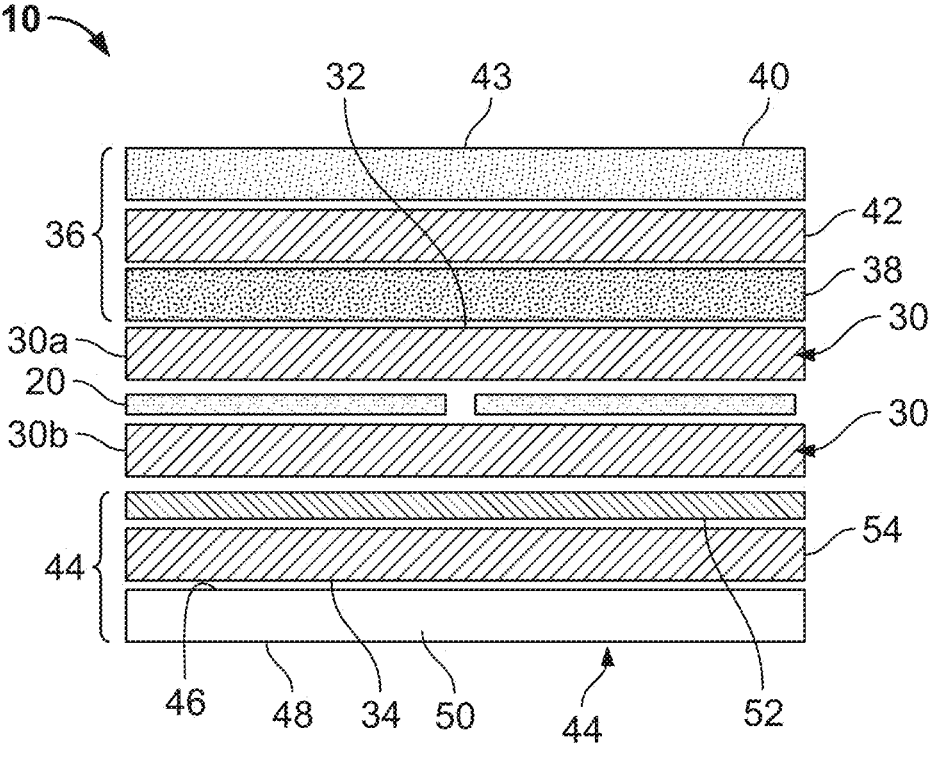

Referring to FIGS. 2 and 3, in some embodiments, the photovoltaic module 10 includes an encapsulant 30 encapsulating the at least one solar cell 20. In some embodiments, the encapsulant 30 includes a first layer 30a having a first surface 32 and a second layer 30b having a second surface 34 opposite the first surface 32. In some embodiments, the photovoltaic module 10 includes a frontsheet 36 juxtaposed with the first surface 32 of the first layer 30a of the encapsulant 30. In some embodiments, the frontsheet 36 includes a glass layer 38. In some embodiments, the frontsheet 36 includes a polymer layer 40 attached to the glass layer 38. In some embodiments, the polymer layer 40 forms an upper surface of the photovoltaic module 10. In some embodiments, the polymer layer 40 is attached to the glass layer 38 by a first adhesive layer 42. In some embodiments, an upper surface 43 of the polymer layer 40 is an upper surface of the photovoltaic module 10. In some embodiments, the upper surface 43 of the polymer layer 40 is textured. In some embodiments, the upper surface 43 of the polymer layer 40 is embossed. In some embodiments, the upper surface 43 of the polymer layer 40 is embossed with a plurality of indentations. In some embodiments, the upper surface 43 of the polymer layer 40 includes a pattern. In some embodiments, the upper surface 43 of the polymer layer 40 includes a printed pattern. In some embodiments, the upper surface 43 of the polymer layer 40 includes an embossed pattern. In some embodiments, the upper surface 43 of the polymer layer 40 includes a textured pattern.

In some embodiments, the photovoltaic module 10 includes a backsheet 44. In some embodiments, the backsheet 44 is juxtaposed with the second surface 34 of the second layer 30b of the encapsulant 30. In some embodiments, the backsheet 44 includes a first surface 46 and a second surface 48 opposite the first surface 46 of the backsheet 44. In some embodiments, the second surface 48 of the backsheet 44 forms a lower surface of the photovoltaic module 10. In some embodiments, the backsheet 44 includes a first layer 50. In some embodiments, the backsheet 44 includes a second layer 52 (see FIG. 3). In some embodiments, the second layer 52 is attached to the first layer 50 by a second adhesive layer 54. In some embodiments, the backsheet 44 includes only one layer (see FIG. 2). In some embodiments, the backsheet 44 includes only the first layer 50 (see FIG. 2). In some embodiments, the backsheet 44 does not include the second layer 52 (see FIG. 2). In some embodiments, the backsheet 44 is composed of a polymer. In some embodiments, the backsheet 44 is composed of thermoplastic polyolefin (TPO). In some embodiments, the backsheet 44 forms the headlap portion 16.

In some embodiments, each of the encapsulant 30, the frontsheet 36, including each of the glass layer 38, the polymer layer 40, and the first adhesive layer 42, and the backsheet 44, including the first layer 50, the second layer 52, and the second adhesive layer 54 of the photovoltaic module 10, as applicable, includes a structure, composition and/or function of similar to those of more or one of the embodiments of the corresponding components disclosed in U.S. Pat. No. 11,870,227, issued Jan. 9, 2024, entitled "Building Integrated Photovoltaic System," owned by GAF Energy LLC, entitled Building Integrated Photovoltaic System, owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

Figure 4:
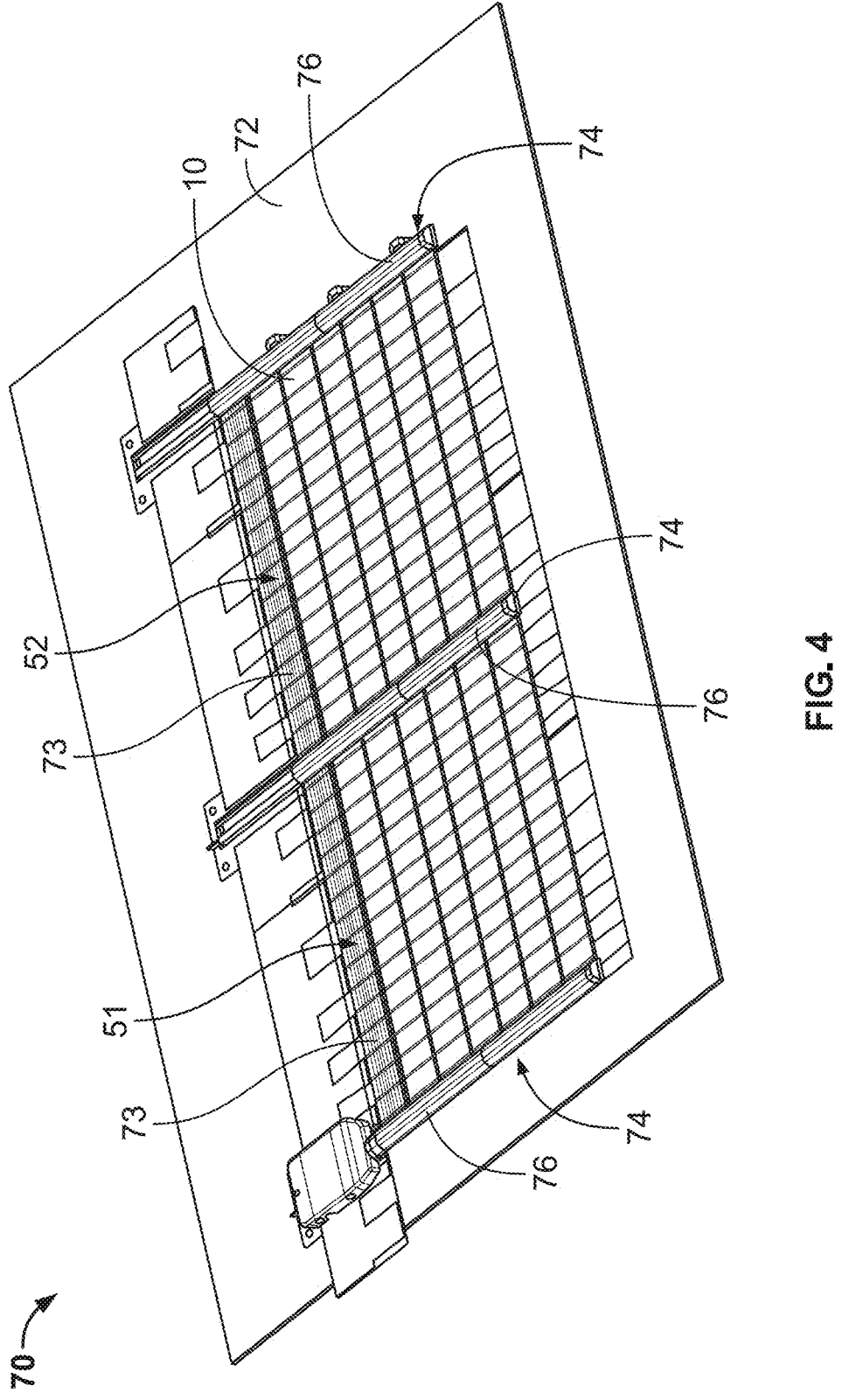
FIG. 4 is a top perspective view of some embodiments of a photovoltaic system.

Referring to FIG. 4, in some embodiments, a system 70 includes a plurality of the photovoltaic modules 10 installed on a roof deck 72. In some embodiments, the plurality of the photovoltaic modules 10 is arranged in an array on the roof deck 72. In some embodiments, the array of the photovoltaic modules 10 includes subarrays S1, S2. In certain embodiments, the array includes more than the two subarrays S1, S2. In some embodiments, the array includes a single array S1. In some embodiments, each of the subarrays S1, S2 include a plurality of rows of the photovoltaic modules 10.

In some embodiments, the reveal portion 18 of one of the photovoltaic modules 10 in the subarray S1 overlays the headlap portion 16 of an adjacent another one of the photovoltaic modules 10 of the subarray S1. In some embodiments, at least a portion of the first side lap 22 of the one of the photovoltaic modules 10 overlays at least a portion of the first side lap 22 of the another one of the photovoltaic modules 10. In some embodiments, at least a portion of the second side lap 24 of the one of the photovoltaic modules 10 overlays at least a portion of the second side lap 24 of the another one of the photovoltaic modules 10.

In some embodiments, the first side lap 22 of one of the photovoltaic modules 10 in the subarray S2 overlays the second side lap 24 of an adjacent another one of the photovoltaic modules 10 in the subarray S1 in the same one of the rows R. In some embodiments, a jumper module 73 overlays an uppermost one of the photovoltaic modules 10 in a column of the subarray S1. In some embodiments, the active portion of the jumper module 73 overlays the headlap portion 16 of the photovoltaic module 10.

In some embodiments, the system 70 includes at least one wireway 74 installed proximate to the first ends 12 of the photovoltaic modules 10. In some embodiments, the at least one wireway 74 is installed proximate to the second end 14 of the photovoltaic modules 10. In some embodiments, the at least one wireway 74 is installed intermediate the first end 12 of one of the photovoltaic modules 10 and a second end 14 of another one of the photovoltaic modules 10. In some embodiments, the at least one wireway 74 includes a wire cover 76. In some embodiments, the wire cover 76 is removably attached to the at least one wireway 74. In some embodiments, the at least one wireway 74 includes a plurality of the wireways 74. In some embodiments, one of the wire covers 76 of one of the plurality of wireways 74 overlaps another of the wire covers 76 of another of the plurality of wireways 74. In some embodiments, the at least one wireway 74 includes a height of 1 mm to 20 mm. In some embodiments, the at least one wireway 74 includes a single wireway installed proximate to the first end of each of the photovoltaic modules 10. In some embodiments, the at least one wireway 74 does not include any electrical components or electrical wires or cables therein. In some embodiments, the at least one wireway 74 and the wire covers 76 include a structure, composition and/or function of similar to those of more or one of the embodiments of the wireways and wire covers disclosed in U.S. Pat. No. 11,870,227, issued Jan. 9, 2024, entitled "Building Integrated Photovoltaic System," owned by GAF Energy LLC, entitled Building Integrated Photovoltaic System, owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

Figure 5:
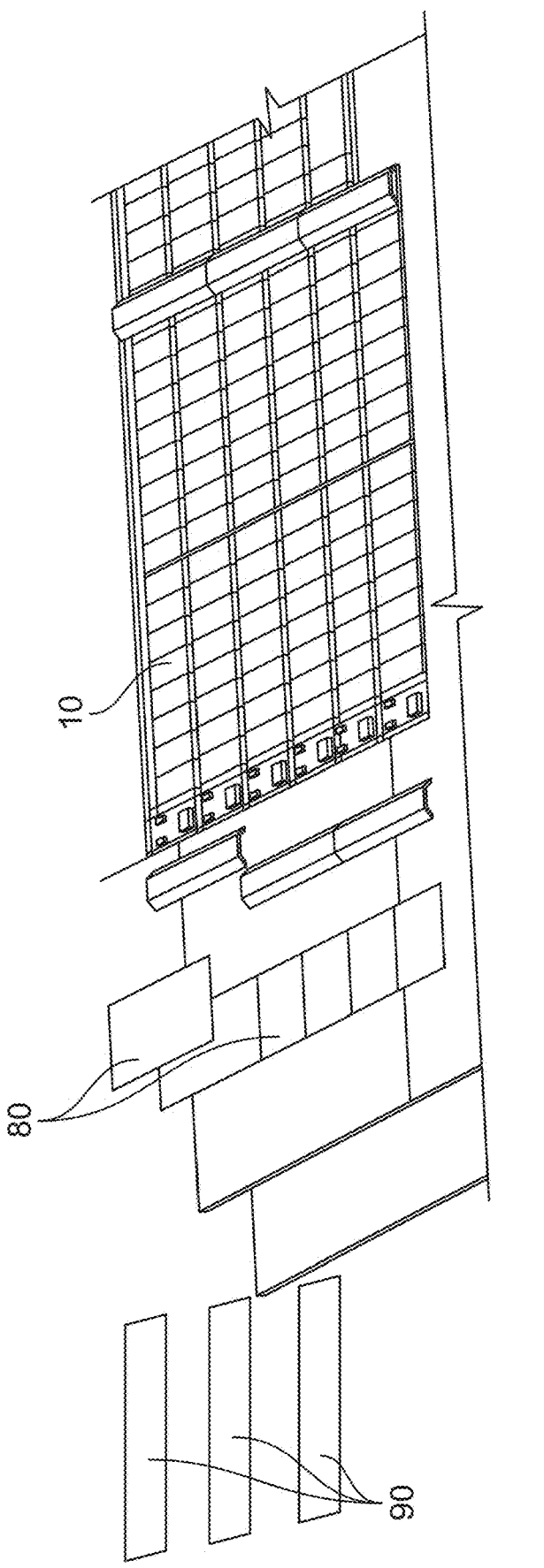
FIG. 5 is a top perspective view of some embodiments of a photovoltaic system.

Referring to FIG. 5, in some embodiments, a plurality of step flaps 80 is installed adjacent to one of the subarrays S1 of the photovoltaic modules 10. In some embodiments, the step flaps 80 are watershedding layers. In some embodiments, one or more of the step flaps 80 includes a structure, composition, function, and/or features, and is installed by a method, similar to those of more or one of the embodiments of the step flaps and methods disclosed in U.S. Pat. No. 11,996,797 to Nguyen et al., issued May 28, 2024, entitled "Step Flaps for Photovoltaic Shingles," the contents of which is incorporated by reference in its entirety.

In some embodiments, one or more of a plurality of roofing shingles 90 are installed on the roof deck 72 and are configured to overlay the step flaps 80. In some embodiments, the roofing shingles 90 are asphalt shingles. In some embodiments, the roofing shingles 90 are composed of asphalt. In some embodiments, the roofing shingles 90 are recycled asphalt (RAS) shingles. In some embodiments, the roofing shingles 90 are composed of recycled asphalt. In some embodiments, the roofing shingles 90 are non-asphalt (NAS) shingles. In some embodiments, the roofing shingles 90 are composed of non-asphaltic material. In some embodiments, the roofing shingles 90 are polymer shingles. In some embodiments, the roofing shingles 90 are composed of polymer. In some embodiments, the roofing shingles 90 are metal shingles. In some embodiments, the roofing shingles 90 are composed of metal. In some embodiments, the roofing shingles 90 are electrically inactive solar shingles. In some embodiments, the step flaps 80 provide a watershedding interface between the photovoltaic modules 10 and the roofing shingles 90. In some embodiments, the roofing shingles 90 consist of different sizes and shapes. In some embodiments, one or more of the roofing shingles 90 includes a size and/or shape that is different from one or more another of the roofing shingles 90. In some embodiments, one or more of the roofing shingles 90 includes a headlap portion 92 and a reveal portion 94 (see FIG. 18). In some embodiments, the headlap portion 92 and the reveal portion 94 have a size and/or shape that is different from the headlap portion 92 and the reveal portion 94 of one or more another of the roofing shingles 90.

Figure 6:
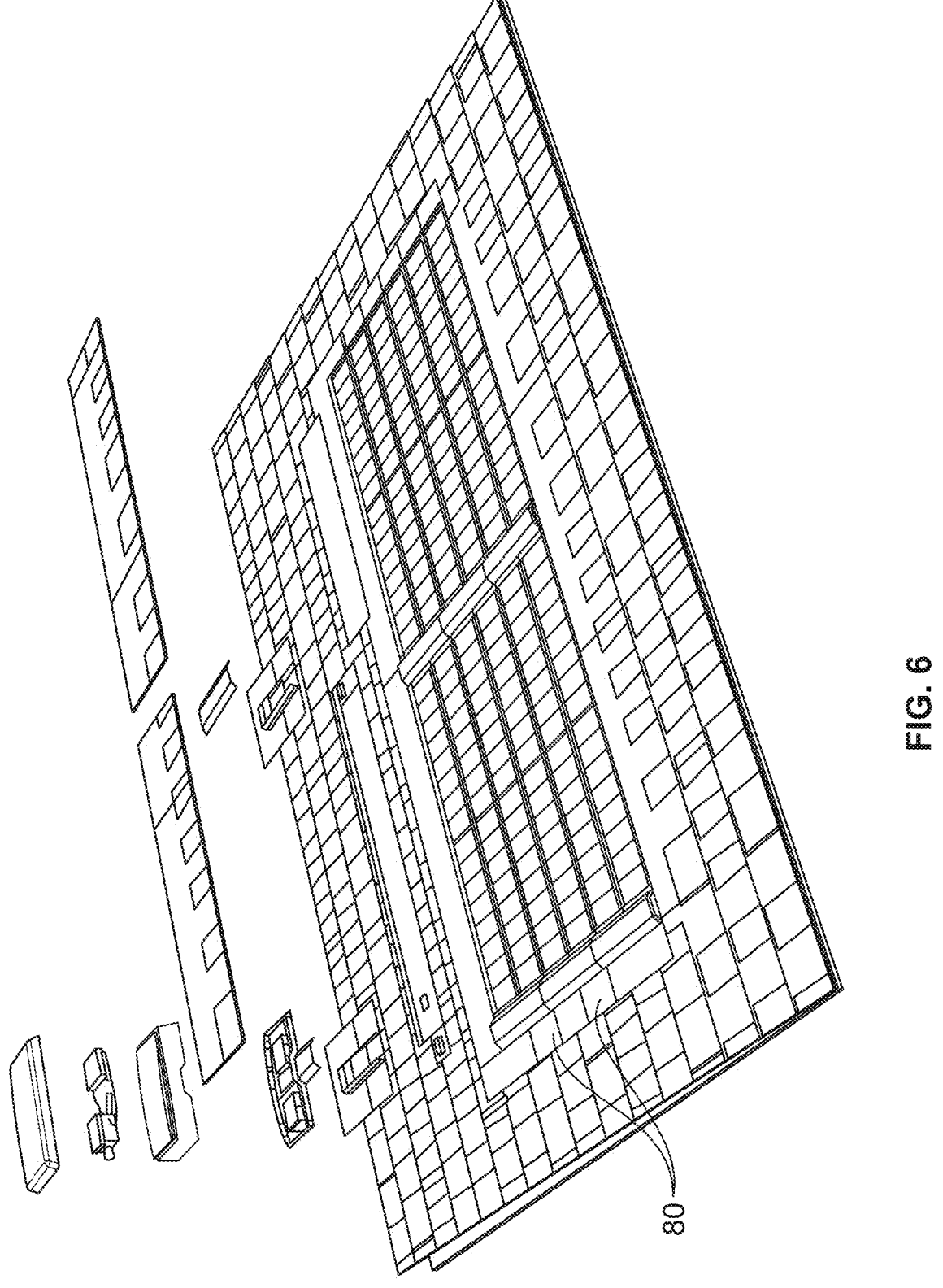
FIG. 6 is a top perspective view of some embodiments of a photovoltaic system.

FIG. 6 illustrates another embodiment of a roofing system with a photovoltaic system including the plurality of step flaps 80.

Figures 7, 7A, 8:
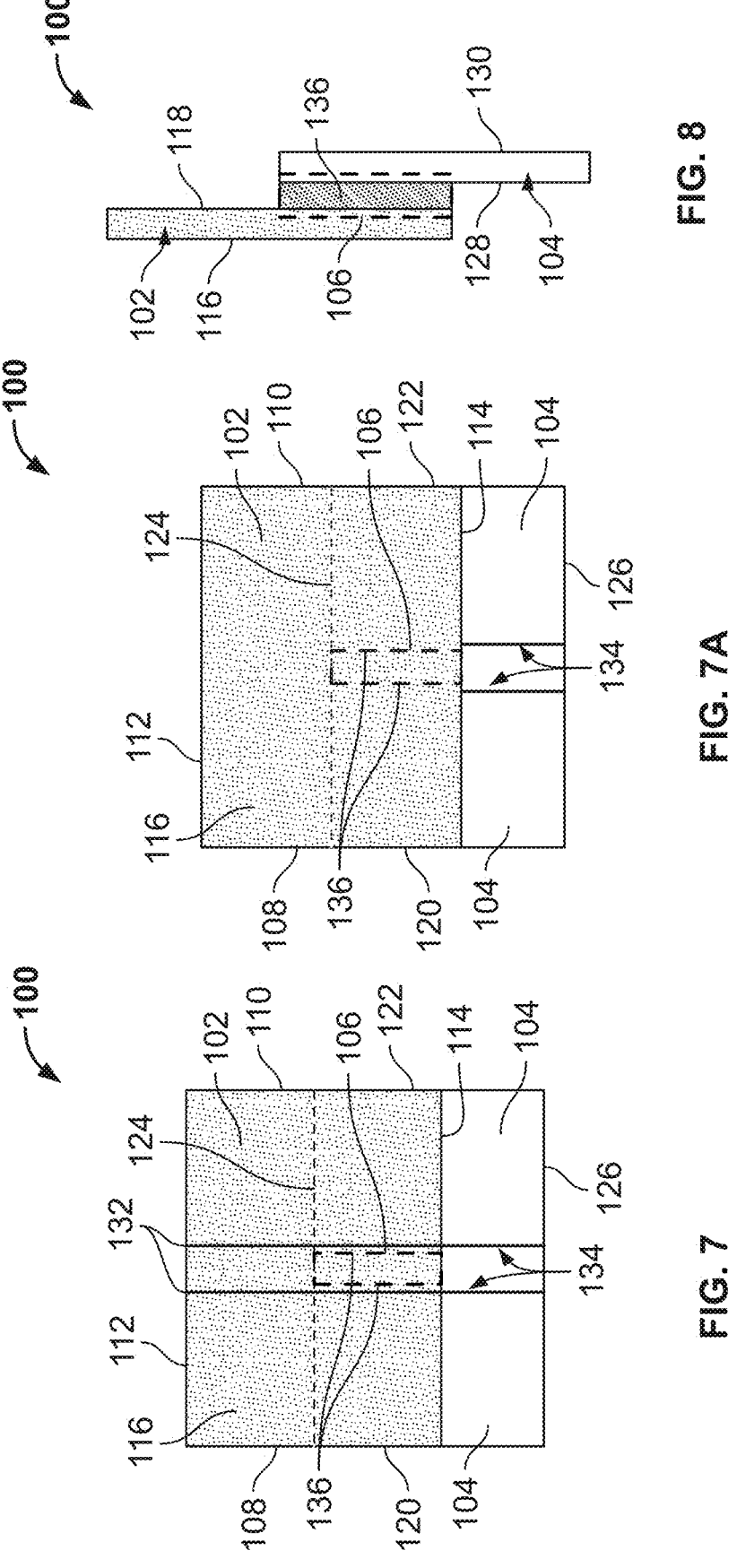
FIGS. 7, 7A and 8 are top plan and side elevational views of some embodiments of a step flap.
Figure 9:
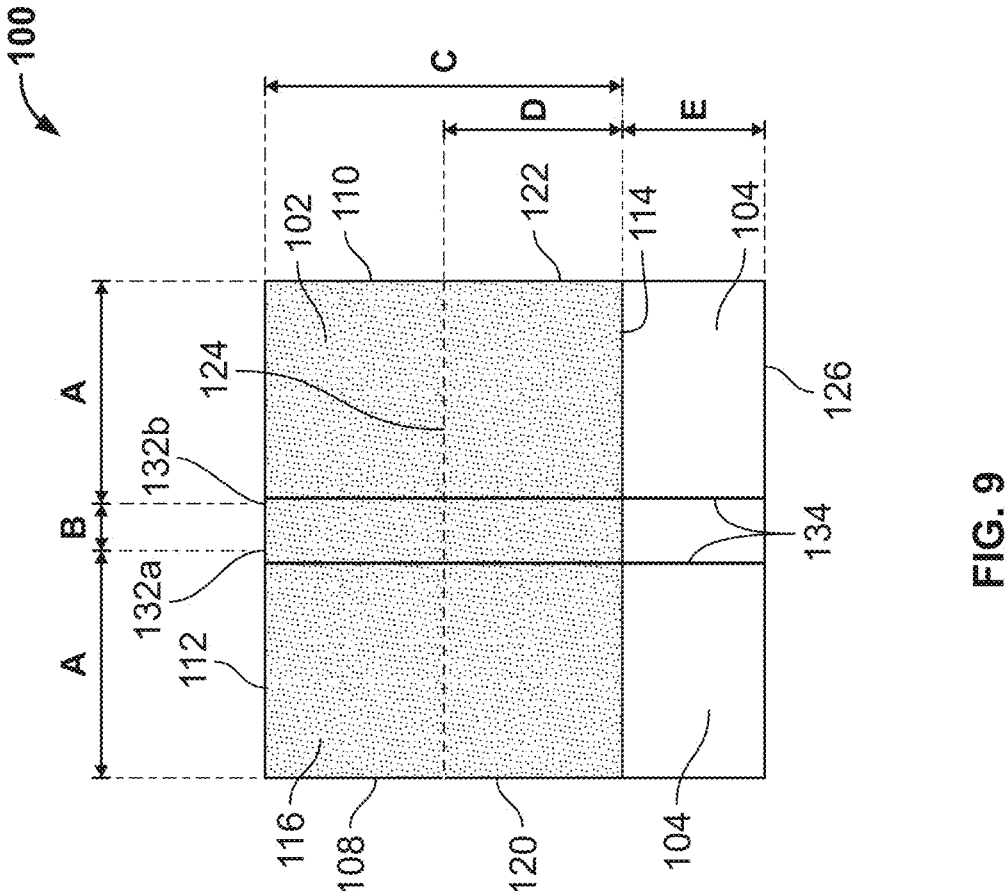

Referring to FIGS. 7 through 9, in some embodiments, a step flap 100 includes a first layer 102 and a second layer 104. In some embodiments, the first layer 102 overlays the second layer 104. In some embodiments, the first layer 102 overlays at least a portion of the second layer 104. In some embodiments, at least a portion of the first layer 102 overlays at least a portion of the second layer 104. In some embodiments, the first layer 102 is an upper layer and the second layer 104 is a lower layer. In some embodiments, the first layer 102 is a watershedding layer. In some embodiments, the second layer 104 is a watershedding layer. In some embodiments, at least a portion of the first layer 102 is attached to at least a portion of the second layer 104. In some embodiments, at least a portion of the first layer 102 is attached to at least a portion of the second layer 104 at an attachment area 106.

In some embodiments, the first layer 102 includes a first end 108, a second end 110 opposite the first end 108, a first edge 112 extending from the first end 108 to the second end 110, a second edge 114 opposite the first edge 112 and extending from the first end 108 to the second end 110, a first surface 116 extending from the first end 108 to the second end 110 and extending from the first edge 112 to the second edge 114, and a second surface 118 opposite the first surface 116 and extending from the first end 108 to the second end 110 and extending from the first edge 112 to the second edge 114. In some embodiments, the first surface 116 is an upper surface and the second surface 118 is a lower surface.

In some embodiments, the second layer 104 includes a first end 120, a second end 122 opposite the first end 120, a first edge 124 extending from the first end 120 to the second end 122, a second edge 126 opposite the first edge 124 and extending from the first end 120 to the second end 122, a first surface 128 extending from the first end 120 to the second end 122 and extending from the first edge 124 to the second edge 126, and a second surface 130 opposite the first surface 128 and extending from the first end 120 to the second end 122 and extending from the first edge 124 to the second edge 126. In some embodiments, the first surface 128 is an upper surface and the second surface 130 is a lower surface.

In some embodiments, at least a portion of the second surface 118 of the first layer 102 is attached to at least a portion of the first surface 128 of the second layer 104. In some embodiments, at least a portion of the second surface 118 of the first layer 102 is attached to at least a portion of the first surface 128 of the second layer 104 at the attachment area 106.

In some embodiments, the first layer 102 is attached to the second layer 104 at the attachment area 106 by an adhesive. In some embodiments, the first layer 102 is attached to the second layer 104 at the attachment area 106 by an adhesive strip or strips, dots, or tape. In some embodiments, the first layer 102 is attached to the second layer 104 at the attachment area 106 by welding. In some embodiments, the first layer 102 is attached to the second layer 104 at the attachment area 106 by heat welding. In some embodiments, the first layer 102 is attached to the second layer 104 at the attachment area 106 by ultrasonic welding. In some embodiments, the first layer 102 is attached to the second layer 104 at the attachment area 106 by thermal bonding. In some embodiments, the first layer 102 is attached to the second layer 104 at the attachment area 106 by a fastener, such as a rivet, screw, nail, or staple. In some embodiments, the attachment area 106 is continuous. In some embodiments, the attachment area 106 is discontinuous such that only portions of the first layer 102 and the second layer 104 within the attachment area are attached to one another. In some embodiments, the attachment area 106 is in the center of the step flap 100 and between the first layer 102 and the second layer 104 where they overlap. In some embodiments, a portion of the first layer 102 is attached, welded, joined, bonded, adhered etc. to a portion of second layer 104 at the attachment area 106.

In an embodiment, the first layer 102 is composed of a polymer. In an embodiment, the first layer 102 includes thermoplastic polyolefin (TPO). In other embodiments, the first layer 102 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyether-sulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidenc fluoride (PVDF), tetrafluoroethylene-hexafluoropropylene copolymers (FEP), and tetrafluoroethylene-hexafluoropropylene-vinylidene fluoride copolymers (THV), or blends thereof. In some embodiments, the first layer 102 is composed of asphalt. In some embodiments, the first layer 102 is composed of recycled asphalt. In some embodiments, the first layer 102 is composed of non-asphaltic material. In some embodiments, the first layer 102 is composed of metal. In some embodiments, the first layer 102 is composed of steel. In some embodiments, the first layer 102 is composed of aluminum. In some embodiments, the first layer 102 includes a flame or fire retardant additive. In some embodiments, the flame/fire retardant additive may be clays, nanoclays, silicas, carbon black, metal hydroxides such as aluminum hydroxide, metal foils, graphite, and combinations thereof.

In an embodiment, the second layer 104 is composed of a polymer. In an embodiment, the second layer 104 includes thermoplastic polyolefin (TPO). In other embodiments, the second layer 104 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyether-sulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidenc fluoride (PVDF), tetrafluoroethylene-hexafluoropropylene copolymers (FEP), and tetrafluoroethylene-hexafluoropropylene-vinylidene fluoride copolymers (THV), or blends thereof. In some embodiments, the second layer 104 is composed of asphalt. In some embodiments, the second layer 104 is composed of recycled asphalt. In some embodiments, the second layer 104 is composed of non-asphaltic material. In some embodiments, the second layer 104 is composed of metal. In some embodiments, the second layer 104 is composed of steel. In some embodiments, the second layer 104 is composed of aluminum. In some embodiments, the second layer 104 includes a flame or fire retardant additive. In some embodiments, the flame/fire retardant additive may be clays, nanoclays, silicas, carbon black, metal hydroxides such as aluminum hydroxide, metal foils, graphite, and combinations thereof.

Referring to FIG. 7, in some embodiments, the first surface 116 of the first layer 102 includes at least two alignment lines or marks 132. In an embodiment, the alignment lines 132 extend from the first edge 112 to the second edge 114 and intermediate the first end 108 and the second end 110 of the first layer 102.

Referring to FIG. 7, in some embodiments, the first surface 128 of the second layer 104 includes at least two alignment lines 134. In an embodiment, the alignment lines 134 extend from a location proximate to the first edge 112 of the first layer 102 and to the second edge 126 of the second layer 104 and intermediate the first end 120 and the second end 122 of the second layer 104. In some embodiments, each of the alignment lines 132 of the first layer 102 align or substantially align with a corresponding one of the alignment lines 134 of the second layer 104. In some embodiments, each of the alignment lines 132 of the first layer 102 is continuous with a corresponding one of the alignment lines 134 of the second layer 104. In some embodiments, the alignment lines 132 of the first layer 102 are offset from and outside of side edges 136 of the attachment area 106. In some embodiments, the alignment lines 132 of the first layer 102 are proximate to the side edges 136 of the attachment area 106. In some embodiments, the alignment lines 132 of the first layer 102 are adjacent the side edges 136 of the attachment area 106. In some embodiments, the alignment lines 134 of the second layer 104 are offset and outside of the side edges 136 of the attachment area 106. In some embodiments, the alignment lines 132 and/or the alignment lines 134 are printed on the first layer 102 and the second layer 104, respectively. In some embodiments, the alignment lines 132 and/or the alignment lines 134 are formed within the first surfaces 116, 128 of the first layer 102 and the second layer 104, respectively, such as by scratching, cutting, lasering, or etching. In some embodiments, the alignment lines 134 of the second layer 104 are not included. In some embodiments, the alignment lines 132 and the alignment lines 134 are visual indications or marks used to align edges of a roofing shingle 90 or a photovoltaic module 10 over the step flap 100 during installation of a roofing system.

Referring to FIG. 7A, in some embodiments, the first layer 102 does not include the alignment marks 132. In some embodiments, only the second layer 104 includes the alignment marks 104.

In an embodiment, the first layer 102 includes a thickness of 0.1 mm to 5 mm. In another embodiment, the first layer 102 includes a thickness of 0.1 mm to 4.5 mm. In another embodiment, the first layer 102 includes a thickness of 0.1 mm to 4 mm. In another embodiment, the first layer 102 includes a thickness of 0.1 mm to 3.5 mm. In another embodiment, the first layer 102 includes a thickness of 0.1 mm to 3 mm. In another embodiment, the first layer 102 includes a thickness of 0.1 mm to 2.5 mm. In another embodiment, the first layer 102 includes a thickness of 0.1 mm to 2 mm. In another embodiment, the first layer 102 includes a thickness of 0.1 mm to 1.5 mm. In another embodiment, the first layer 102 includes a thickness of 0.1 mm to 1 mm. In another embodiment, the first layer 102 includes a thickness of 0.1 mm to 0.5 mm.

In an embodiment, the first layer 102 includes a thickness of 0.5 mm to 5 mm. In another embodiment, the first layer 102 includes a thickness of 0.5 mm to 4.5 mm. In another embodiment, the first layer 102 includes a thickness of 0.5 mm to 4 mm. In another embodiment, the first layer 102 includes a thickness of 0.5 mm to 3.5 mm. In another embodiment, the first layer 102 includes a thickness of 0.5 mm to 3 mm. In another embodiment, the first layer 102 includes a thickness of 0.5 mm to 2.5 mm. In another embodiment, the first layer 102 includes a thickness of 0.5 mm to 2 mm. In another embodiment, the first layer 102 includes a thickness of 0.5 mm to 1.5 mm. In another embodiment, the first layer 102 includes a thickness of 0.5 mm to 1 mm.

In an embodiment, the first layer 102 includes a thickness of 1 mm to 5 mm. In another embodiment, the first layer 102 includes a thickness of 1 mm to 4.5 mm. In another embodiment, the first layer 102 includes a thickness of 1 mm to 4 mm. In another embodiment, the first layer 102 includes a thickness of 1 mm to 3.5 mm. In another embodiment, the first layer 102 includes a thickness of 1 mm to 3 mm. In another embodiment, the first layer 102 includes a thickness of 1 mm to 2.5 mm. In another embodiment, the first layer 102 includes a thickness of 1 mm to 2 mm. In another embodiment, the first layer 102 includes a thickness of 1 mm to 1.5 mm.

In an embodiment, the first layer 102 includes a thickness of 1.5 mm to 5 mm. In another embodiment, the first layer 102 includes a thickness of 1.5 mm to 4.5 mm. In another embodiment, the first layer 102 includes a thickness of 1.5 mm to 4 mm. In another embodiment, the first layer 102 includes a thickness of 1.5 mm to 3.5 mm. In another embodiment, the first layer 102 includes a thickness of 1.5 mm to 3 mm. In another embodiment, the first layer 102 includes a thickness of 1.5 mm to 2.5 mm. In another embodiment, the first layer 102 includes a thickness of 1.5 mm to 2 mm.

In an embodiment, the first layer 102 includes a thickness of 2 mm to 5 mm. In another embodiment, the first layer 102 includes a thickness of 2 mm to 4.5 mm. In another embodiment, the first layer 102 includes a thickness of 2 mm to 4 mm. In another embodiment, the first layer 102 includes a thickness of 2 mm to 3.5 mm. In another embodiment, the first layer 102 includes a thickness of 2 mm to 3 mm. In another embodiment, the first layer 102 includes a thickness of 2 mm to 2.5 mm.

In an embodiment, the first layer 102 includes a thickness of 2.5 mm to 5 mm. In another embodiment, the first layer 102 includes a thickness of 2.5 mm to 4.5 mm. In another embodiment, the first layer 102 includes a thickness of 2.5 mm to 4 mm. In another embodiment, the first layer 102 includes a thickness of 2.5 mm to 3.5 mm. In another embodiment, the first layer 102 includes a thickness of 2.5 mm to 3 mm.

In an embodiment, the first layer 102 includes a thickness of 3 mm to 5 mm. In another embodiment, the first layer 102 includes a thickness of 3 mm to 4.5 mm. In another embodiment, the first layer 102 includes a thickness of 3 mm to 4 mm. In another embodiment, the first layer 102 includes a thickness of 3 mm to 3.5 mm. In an embodiment, the first layer 102 includes a thickness of 3.5 mm to 5 mm. In another embodiment, the first layer 102 includes a thickness of 3.5 mm to 4.5 mm. In another embodiment, the first layer 102 includes a thickness of 3.5 mm to 4 mm. In an embodiment, the first layer 102 includes a thickness of 4 mm to 5 mm. In another embodiment, the first layer 102 includes a thickness of 4 mm to 4.5 mm. In an embodiment, the first layer 102 includes a thickness of 4.5 mm to 5 mm.

In an embodiment, the first layer 102 includes a thickness of 0.1 mm. In an embodiment, the first layer 102 includes a thickness of 0.5 mm. In an embodiment, the first layer 102 includes a thickness of 1 mm. In an embodiment, the first layer 102 includes a thickness of 1.5 mm. In an embodiment, the first layer 102 includes a thickness of 2 mm. In an embodiment, the first layer 102 includes a thickness of 2.5 mm. In an embodiment, the first layer 102 includes a thickness of 3 mm. In an embodiment, the first layer 102 includes a thickness of 3.5 mm. In an embodiment, the first layer 102 includes a thickness of 4 mm. In an embodiment, the first layer 102 includes a thickness of 4.5 mm. In an embodiment, the first layer 102 includes a thickness of 5 mm.

In some embodiments, the second layer 104 includes a thickness of 0.1 mm to 5 mm. In some embodiments, the second layer 104 includes a thickness in the ranges as those described above with respect to the first layer 102.

Figure 10:
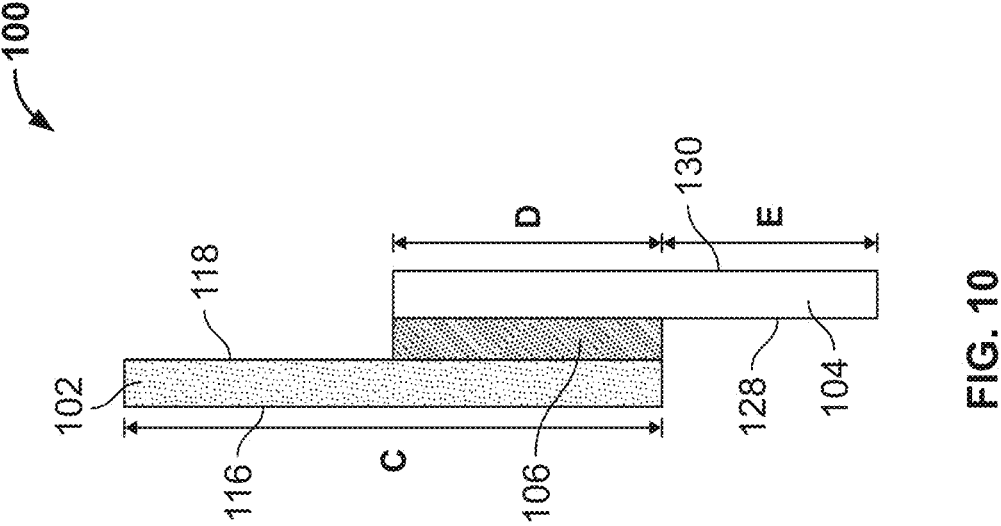
FIGS. 9 and 10 are a top plan view and a side elevational view, respectively, of some embodiments of a step flap employed by embodiments of photovoltaic systems.

Referring to FIGS. 9 and 10, in some embodiments, width A is the width from a first edge of the step flap 100, namely, the first end 108 of the first layer 102 and the first end 120 of the second layer 104 to alignment line 132a; and width A is similarly the width between a second edge of the step flap 100, namely, the second end 110 of the first layer 102 and the second end 122 of the second layer 104 to alignment line 132b. In some embodiments, the width A is symmetrical on either side of the step flap 100. In some embodiments, the width A is 3 inches to 10 inches. In some embodiments, the width A is 1 inch to 10 inches.

In some embodiments, width B is between widths A and is the space between the alignment lines 132a, 132b. In some embodiments, the width B is based on the width of the attachment area 106. In some embodiments, the width B is 0.5 inch to 5 inches.

In some embodiments, width C is the width from the first edge 112 to the second edge 114 of the first layer 102. In some embodiments, width C is based on the corresponding width of the photovoltaic module 10 that overlays the step flap 100. In some embodiments, width C is based on the corresponding width of a roofing shingle 90 that overlays the step flap 100. In some embodiments, the width C is 8 inches to 13 inches.

In some embodiments, width D is the width of the overlap of the first layer 102 over the second layer 104, namely, from the first edge 124 of the second layer 104 to the second edge 114 of the first layer 102. In some embodiments, the width D defines the maximum height of the attachment area 106. In some embodiments, the width D is 1.5 inches to 8 inches.

In some embodiments, width E is the width from the second edge 114 of the first layer 102 to the second edge 126 of the second layer 104. In some embodiments, the width E is the size of the exposed area of the second layer 104 of the step flap 100. In some embodiments, width E is based on the corresponding width of the reveal portion 18 of the photovoltaic module 10 that overlays the step flap 100. In some embodiments, the width E is based on the corresponding width of a reveal portion 94 of a roofing shingle 90 that overlays the step flap 100. In some embodiments, the width E is 1 inch to 8 inches.

Figure 11:
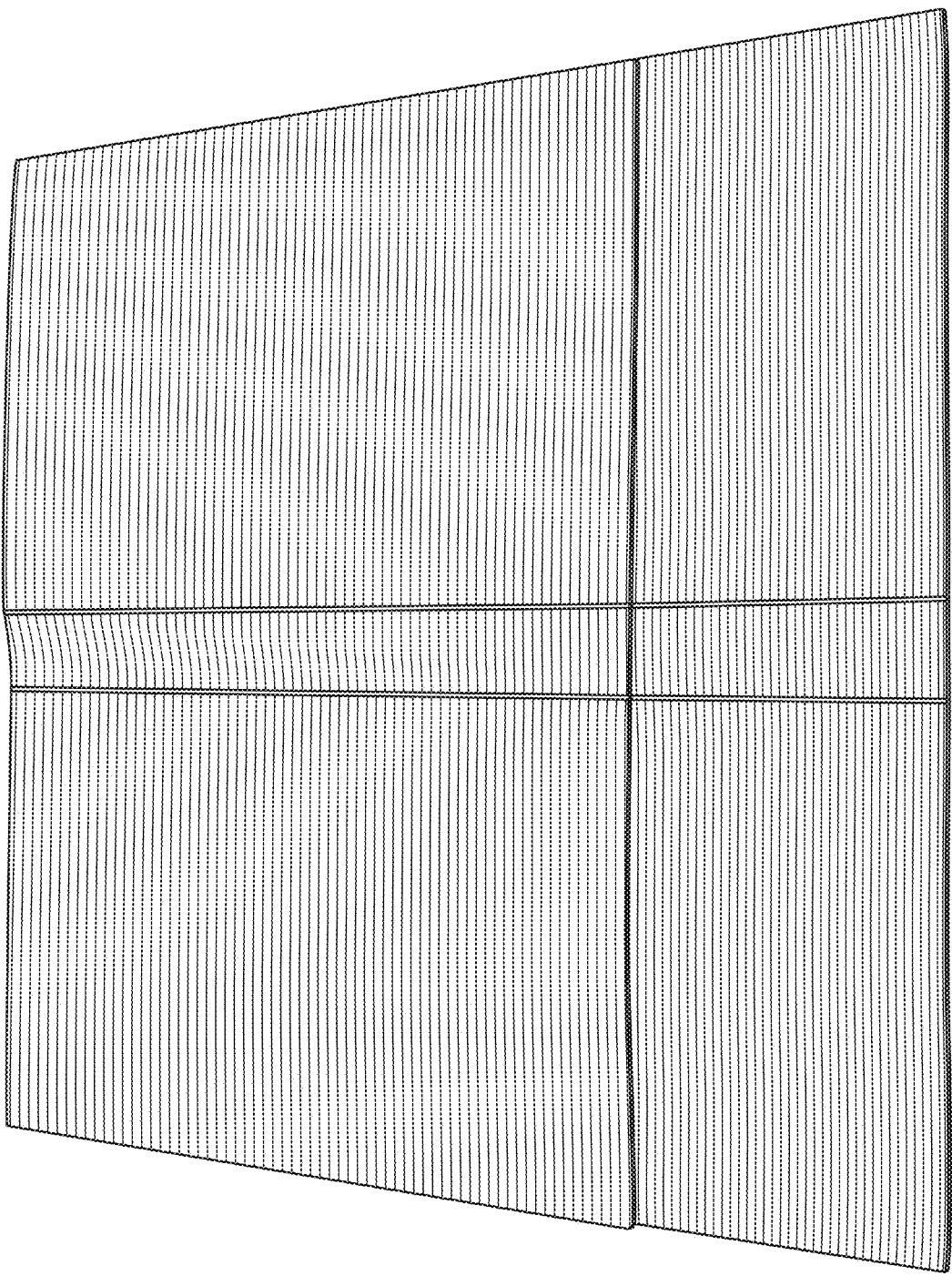
FIGS. 11 and 11A are photographs of some embodiments of a step flap.
Figure 11A:
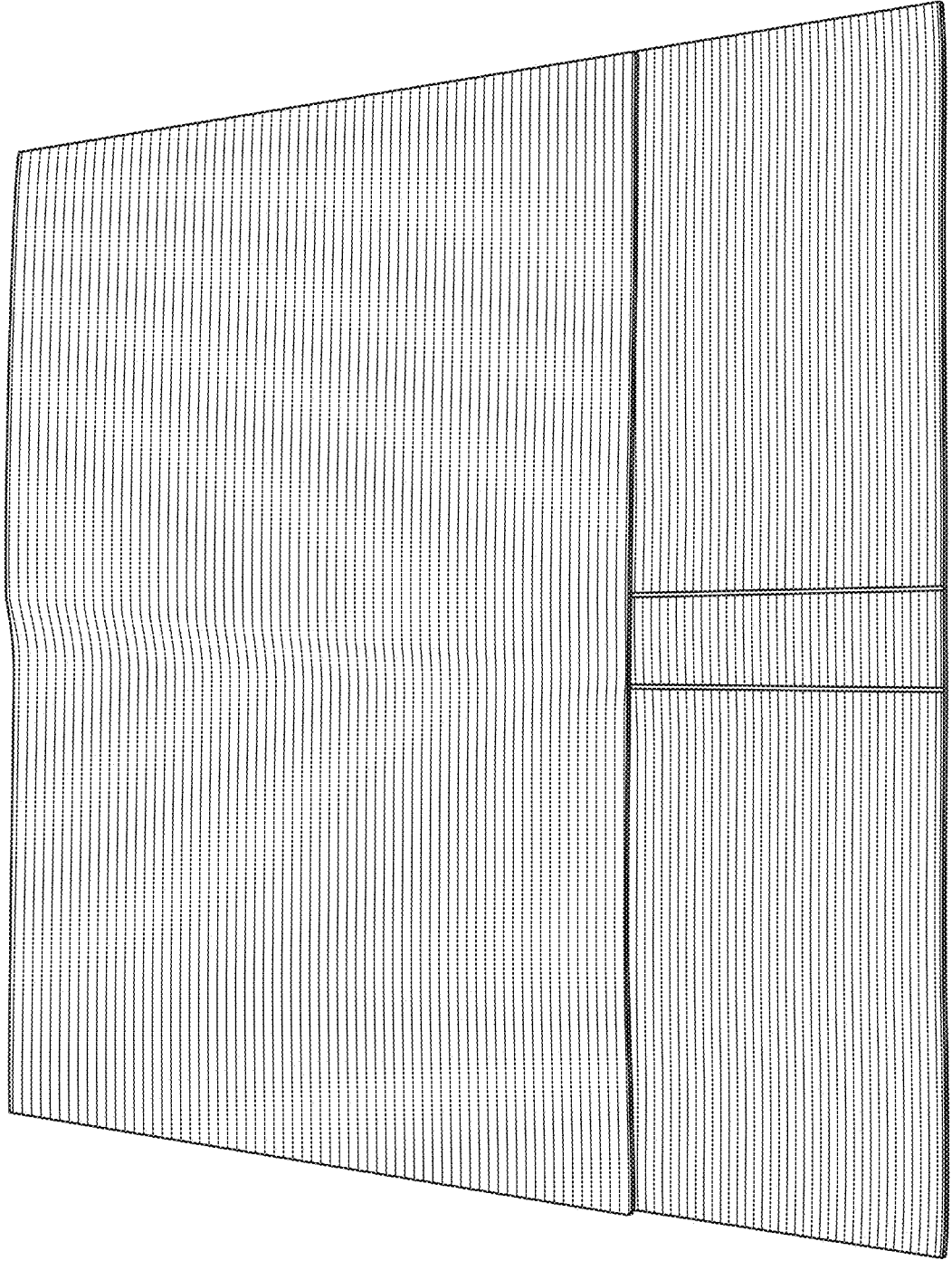
Figure 12:
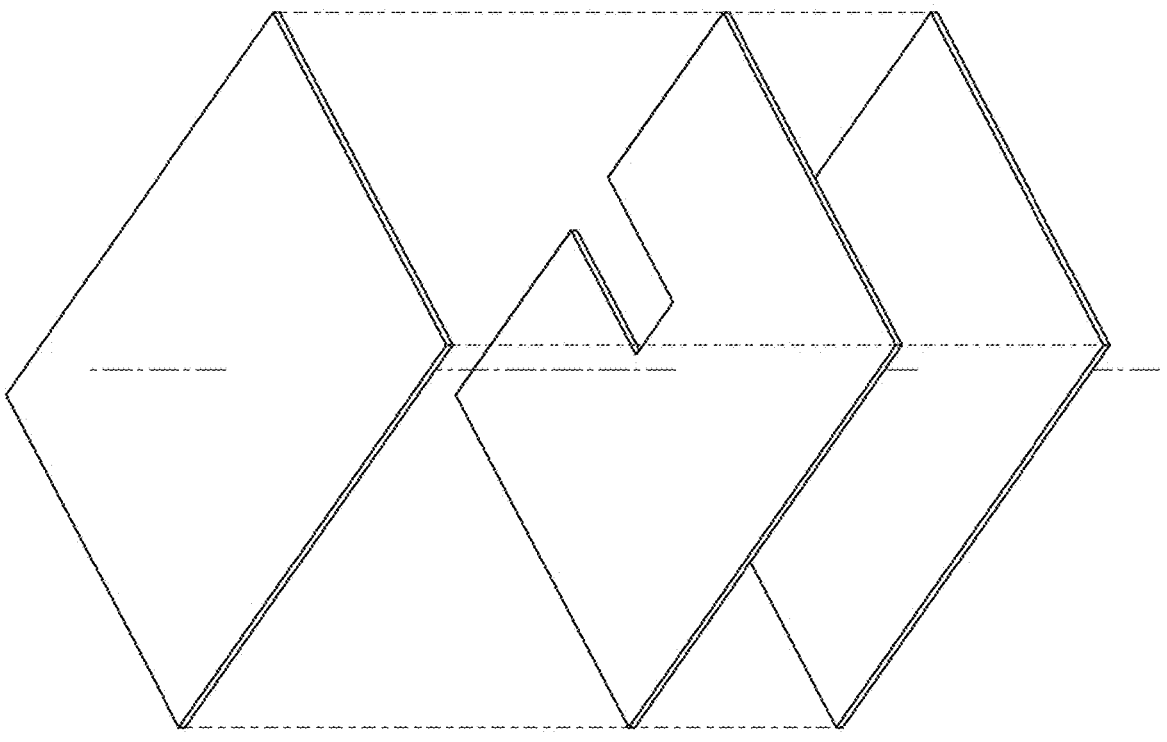
FIG. 12 is an exploded perspective view of some embodiments of a step flap.

FIGS. 11 and 11A are photographs of some embodiments of the step flap 100. FIG. 12 shows an embodiment of the step flap 100 with a release liner 140. In some embodiments, the release liner 140 is between the overlapped portions of the first layer 102 and the second layer 104. In some embodiments, the release liner 140 includes a cutout 142. In some embodiments, the cutout 142 surrounds the attachment area 106, leaving the space open for the attachment of the first layer 102 to the second layer 104. In some embodiments, the release liner 140 is removable from the step flap 100. In some embodiments, the release liner 140 is configured to be pulled out from between the first layer 102 and the second layer 104. In some embodiments, the release liner is composed of sheet of film. In an embodiment, the release liner 140 is a peel and stick film sheet. In an embodiment, the release liner is composed of EverGuard Freedom HW peel and stick membrane manufactured by GAF.

Figure 14:
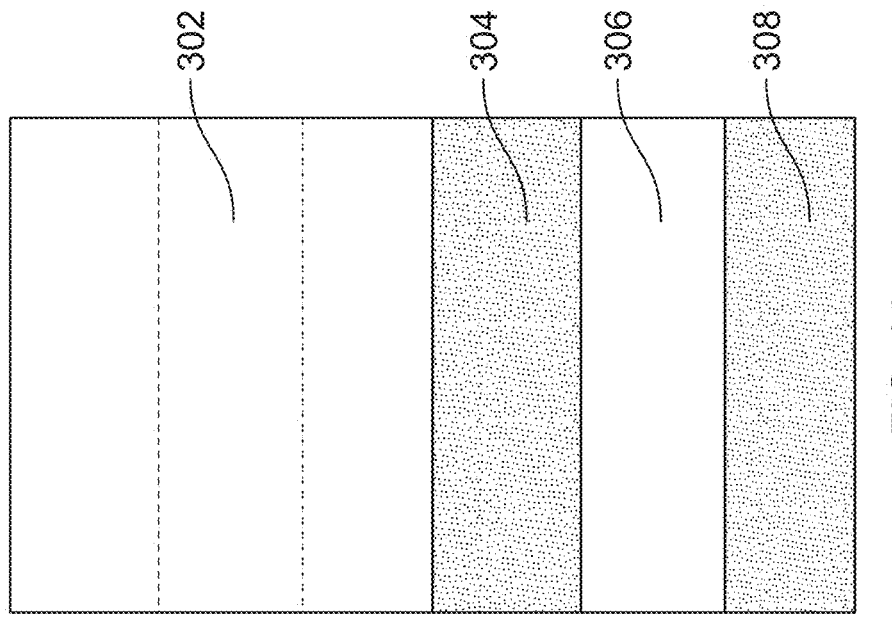
FIGS. 13 and 14 are top plan views of some embodiments of a step flap.
Figure 13:
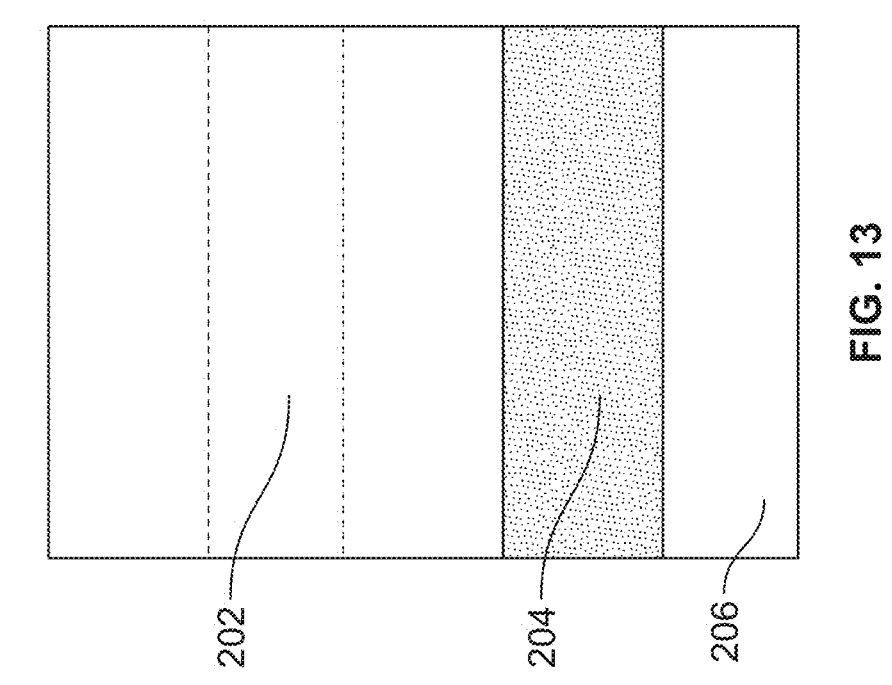

Referring to FIG. 13, in some embodiments, a step flap 200 has three layers, namely, a first layer 202, a second layer 204, and a third layer 206, and corresponding attachment areas. Referring to FIG. 14, in some embodiments, a step flap 300 has three layers, namely, a first layer 302, a second layer 304, a third layer 306, and a fourth layer 308 and corresponding attachment areas. In some embodiments, the width D of the step flaps 200, 300 would be maintained from that of the step flap 100, but the width E would be shortened. In some embodiments, the step flap 100 may have more than four layers, e.g., five layers, six layers, seven layers, eight layers, nine layers, ten layers, etc.

Figure 15:
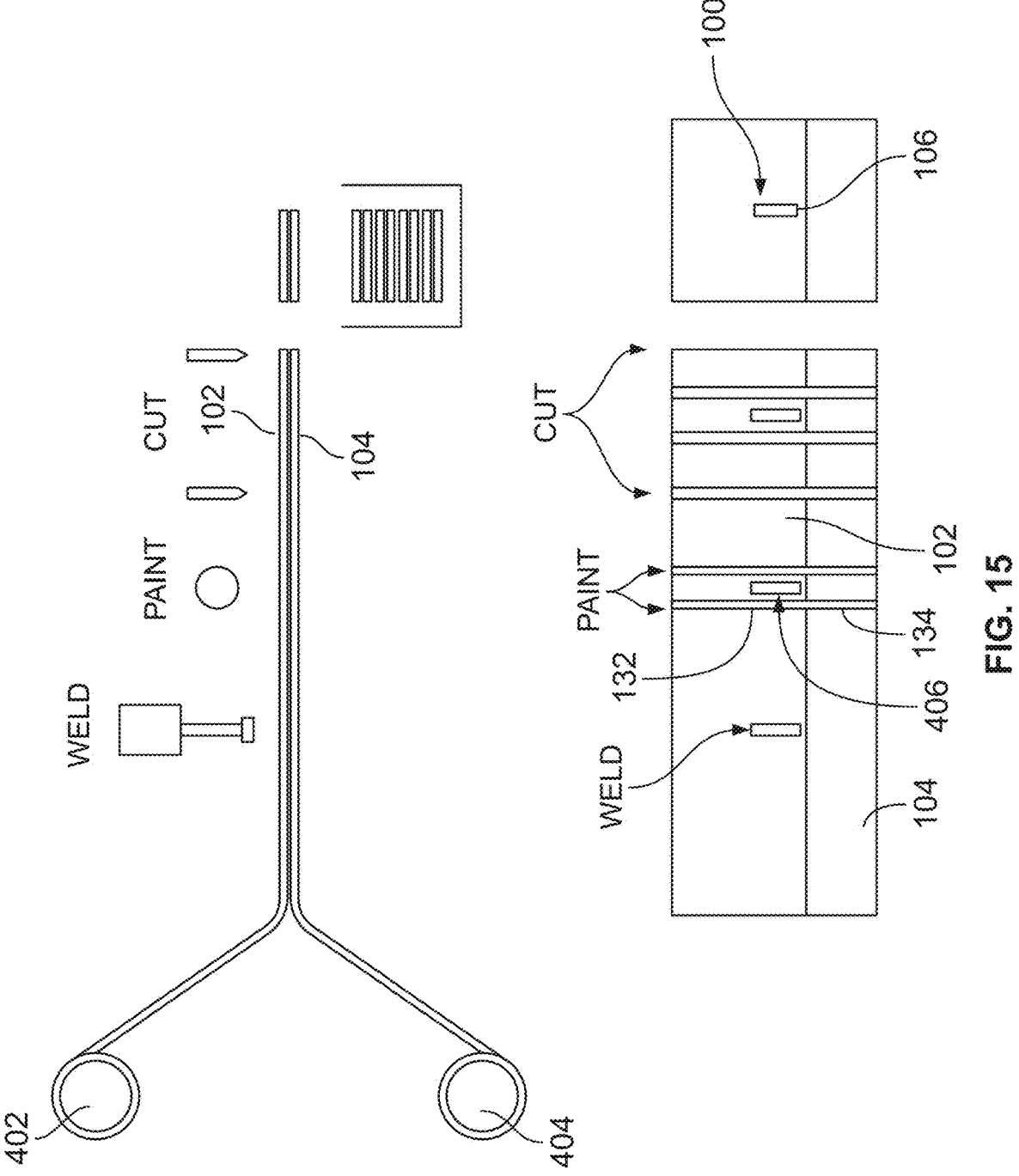
FIGS. 15 and 16 illustrate views of methods of manufacturing embodiments of a step flap.
Figure 16:
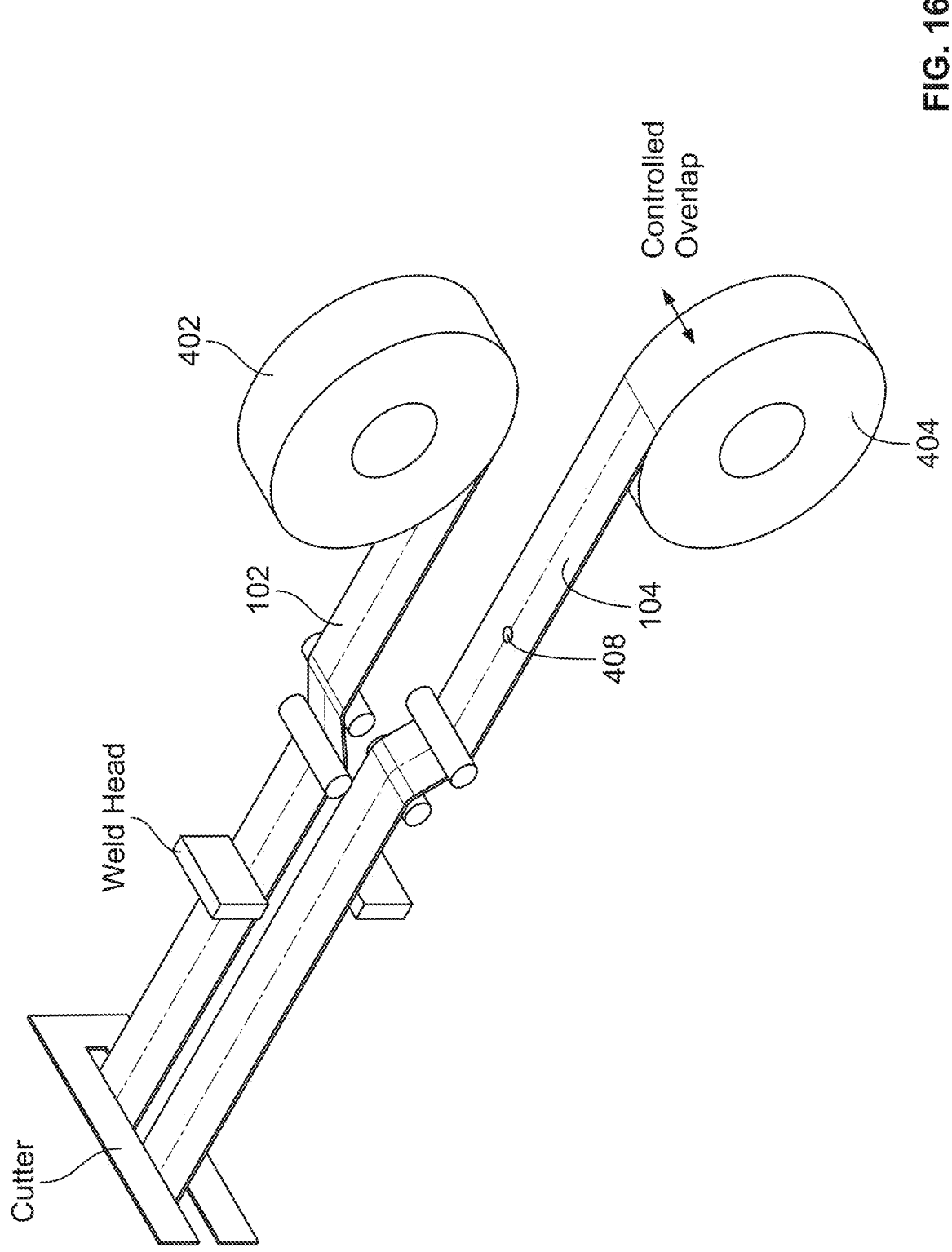

Referring to FIGS. 15 and 16, methods of manufacturing the step flap 100 are shown with assembly lines. In some embodiments, sheet material composing the first layer 102 is offset in a controlled manner from sheet material composing the second layer 104, which are rolled from corresponding rollers 402, 404. In some embodiments, the sheet material composing the first layer 102 is attached (e.g., welded) to the sheet material composing the second layer 104 at various areas to form the various attachment areas 106 for the plurality of the step flaps 100. In some embodiments, the alignment lines 132, 134 are printed, painted, etched, or otherwise formed on the first layer 102 and the second layer 104 in locations as described above. In some embodiments, an adhesive 408 is optionally dispensed at an adhesive dispensing location. In some embodiments, a cutter cuts the first layer 102 and the second layer 104 to the desired size and shape to form the step flaps 100.

Figure 17:
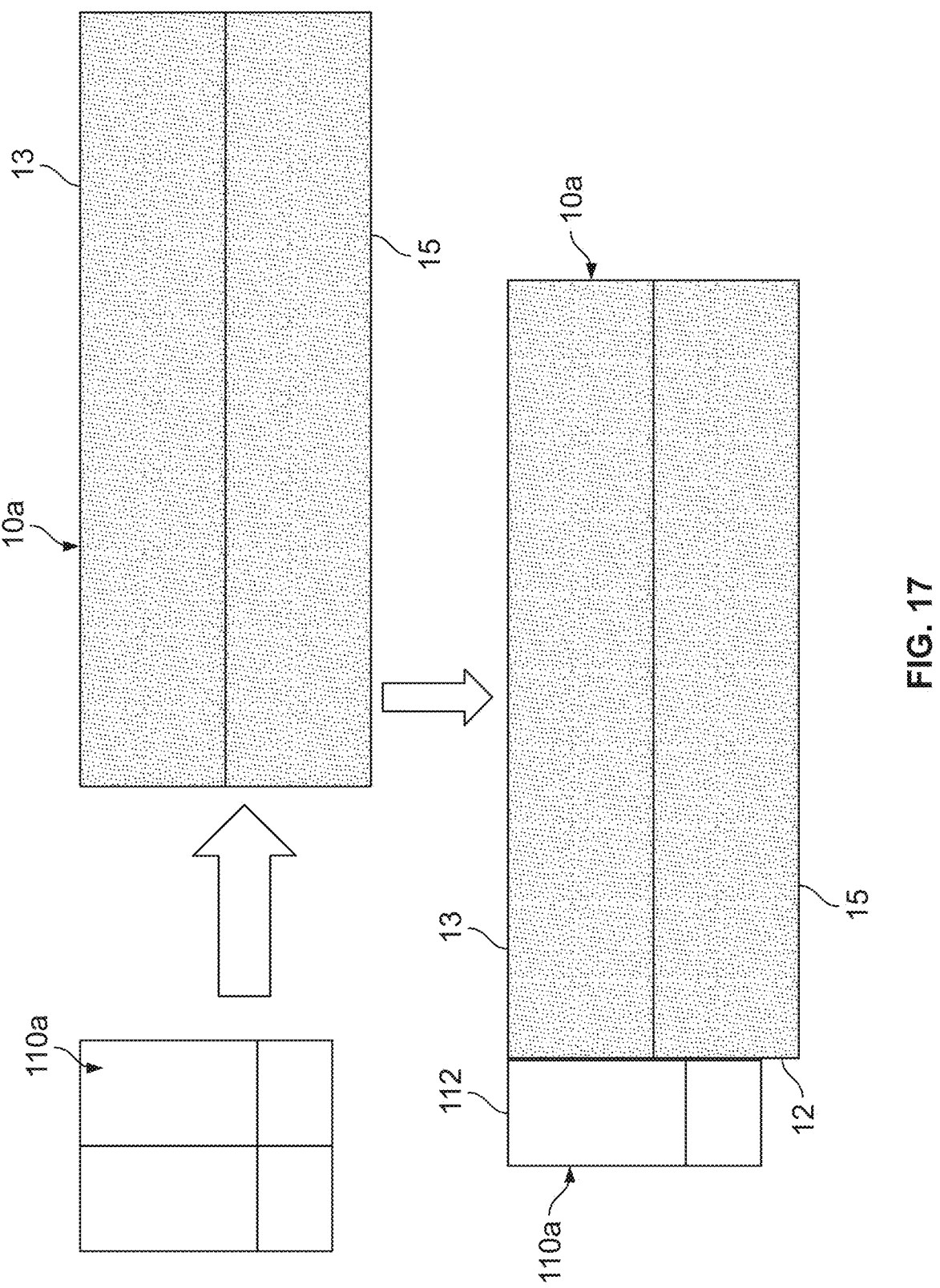
FIGS. 17 through 21 illustrate views of some embodiments of a method of installing photovoltaic modules, roofing shingles, and step flaps employed by a photovoltaic system.

Referring to FIGS. 17 through 21, in some embodiments, a method of installation of a plurality of step flaps 100 with the roofing system including the photovoltaic modules 10 and roofing shingles 90. Referring to FIG. 17, in some embodiments, a photovoltaic module 10a is installed on the roof deck 72. In some embodiments, a first row of the photovoltaic modules 10 including the photovoltaic module 10a is installed on the roof deck 72. In some embodiments, the step flap 100a is installed under the first end 12 of the photovoltaic module 10a. In some embodiments, a first one of the step flap 100a is installed under the first side lap 22 of the photovoltaic module 10a on the left edge of the subarray S1. In some embodiments, the first edge 112 of the first layer 102 of the step flap 100a is aligned or substantially aligned with the first edge 13 of the photovoltaic module 10a. In some embodiments, the first end 12 of the photovoltaic module 10a aligns with the left alignment lines 132, 134 of the step flap 100a. In some embodiments, the attachment area 106 is underneath the photovoltaic module 10a.

Figure 18:
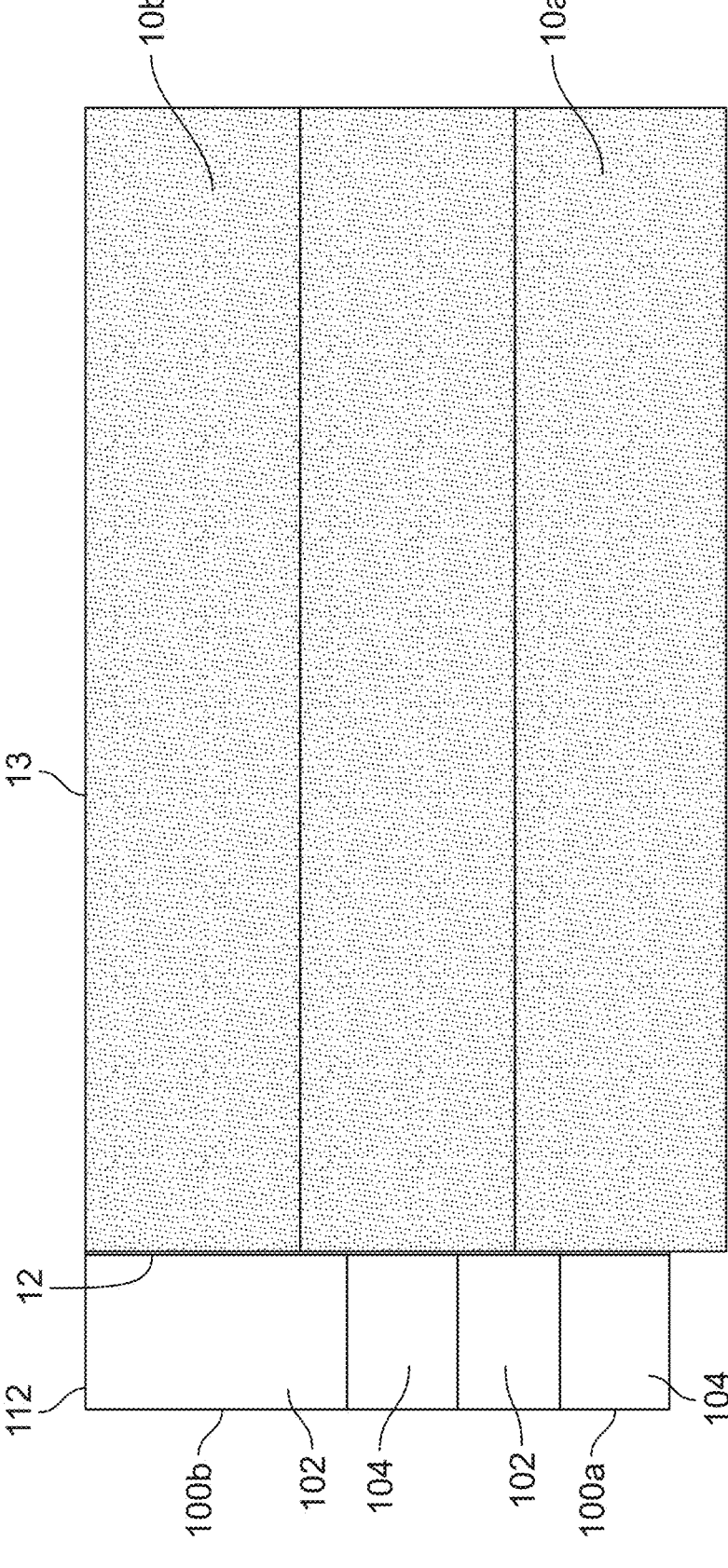

Referring to FIG. 18, in some embodiments, a photovoltaic module 10b is installed on the roof deck 72. In some embodiments, the photovoltaic module 10b overlays the headlap portion 16 of the photovoltaic module 10a. In some embodiments, a second row of the photovoltaic modules 10 including the photovoltaic module 10b is installed on the roof deck 72. In some embodiments, a step flap 100b is installed under the first end 12 of the photovoltaic module 10b. In some embodiments, the step flap 100b is installed under the first side lap 22 of the photovoltaic module 10b on the left edge of the subarray S1. In some embodiments, the first edge 112 of the first layer 102 of the step flap 100b is aligned or substantially aligned with the first edge 13 of the photovoltaic module 10b. In some embodiments, the first end 12 of the photovoltaic module 10a aligns with the left alignment lines 132, 134 of the step flap 100b. In some embodiments, the attachment area 106 of the step flap 100b is underneath the photovoltaic module 10b. In some embodiments, the step flap 100b overlays the step flap 100a. In some embodiments, the second layer 104 of the step flap 100b overlays the first layer 102 of the step flap 100a. In some embodiments, at least a portion of each of the first layer 102 and the second layer 104 of each of the step flaps 100a, 100b are exposed at this stage.

Figure 19:
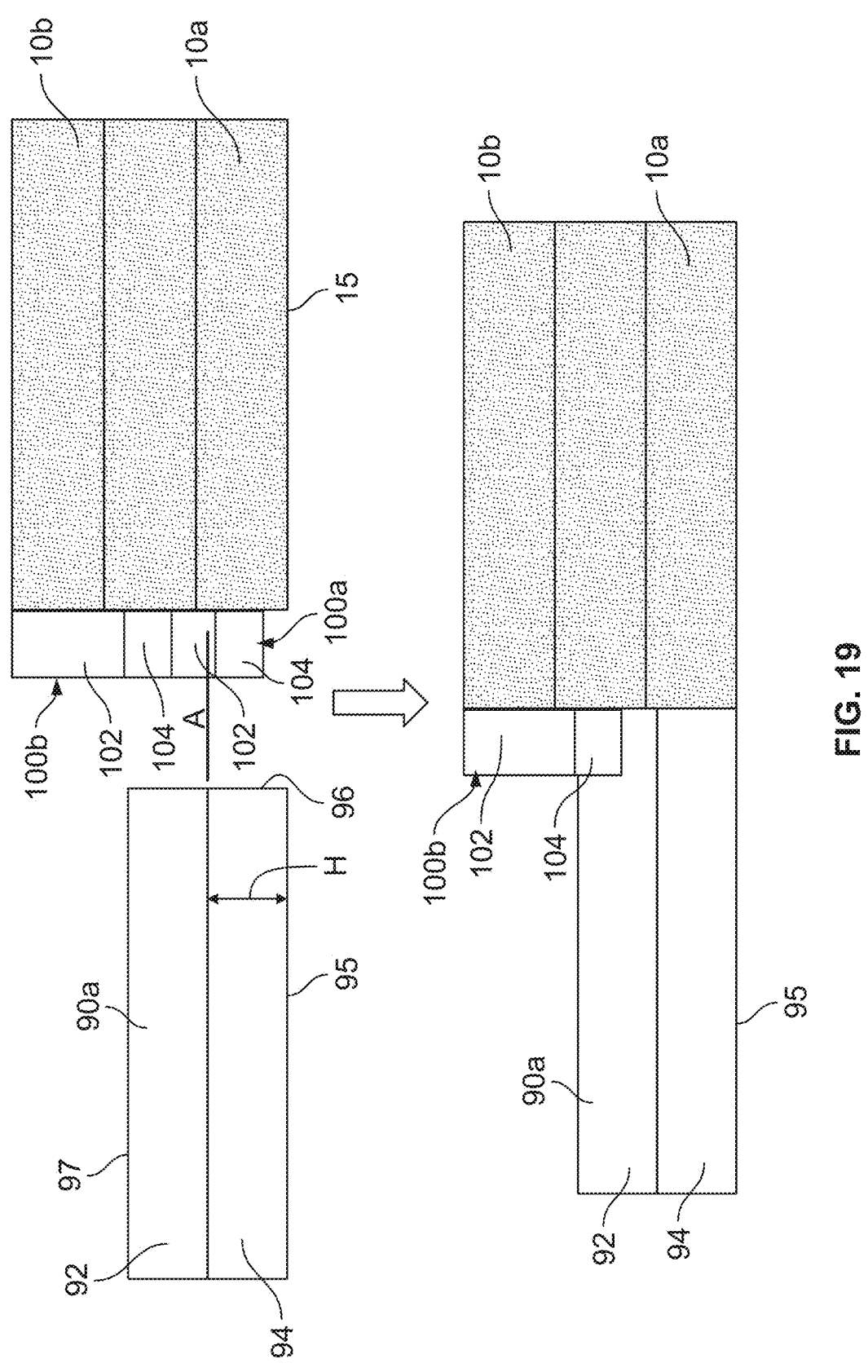

Referring to FIG. 19, in some embodiments, a first roofing shingle 90a is installed on the roof deck 72. In some embodiments, a lower edge 95 of the roofing shingle 90a is aligned or substantially aligned with the second edge 15 (lower edge) of the photovoltaic module 10a. In some embodiments, an installer compares where the height H of the reveal portion 94 of the first roofing shingle 90a is vertically relative to the stack of the step flap 100a and the step flap 100b using imaginary axis A as a guide. In some embodiments, a first edge 96 (e.g., right side edge) of the first roofing shingle 90a is inserted between selected layers of the step flap 100a and the step flap 100b so that no layer of either overlays the reveal portion 94 of the first roofing shingle 90a. For example, in some embodiments, as shown in FIG. 19, the first edge 96 of the roofing shingle 90a overlays the first layer 102 and the second layer 104 of the step flap 100a and is between the second layer 104 of the step flap 100b and the first layer 102 and the second layer 104 of the step flap 100a, such that the second layer 104 of the step flap 100b overlays the headlap portion 92 but does not overlay the reveal portion 94 of the first roofing shingle 90a. It will be understood that the first edge 96 of the roofing shingle 90a may overlay and be located between different layers of the step flap 100a and the step flap 100b, depending on the height H of the reveal portion 94 of the first roofing shingle 90a.

Figure 20:
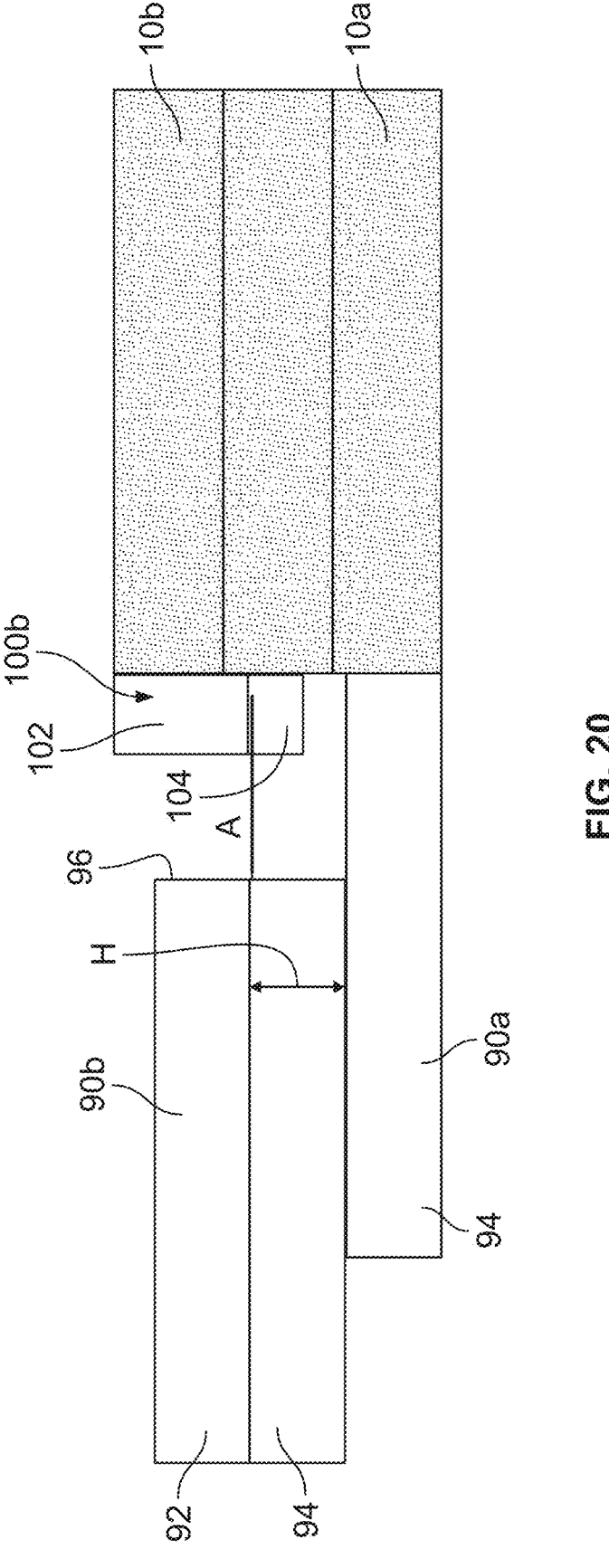

Referring to FIG. 20, in some embodiments, a second roofing shingle 90b is installed on the roof deck 72. In some embodiments, the reveal portion 94 of the second roofing shingle 90b overlays the headlap portion 92 of the first roofing shingle 90a.

In some embodiments, one or both of the roofing shingles 90a, 90b are asphalt shingles. In some embodiments, one or both of the roofing shingles 90a, 90b are recycled asphalt (RAS) shingles. In some embodiments, one or both of the roofing shingles 90a, 90b are polymer shingles. In some embodiments, one or both of the roofing shingles 90a, 90b are metal shingles. In some embodiments, one or both of the roofing shingles 90a, 90b are non-asphalt (NAS) shingles. In some embodiments, one or both of the roofing shingles 90a, 90b are electrically inactive solar shingles. In some embodiments, one or both of the roofing shingles 90a, 90b are electrically active solar shingles.

Figure 21:
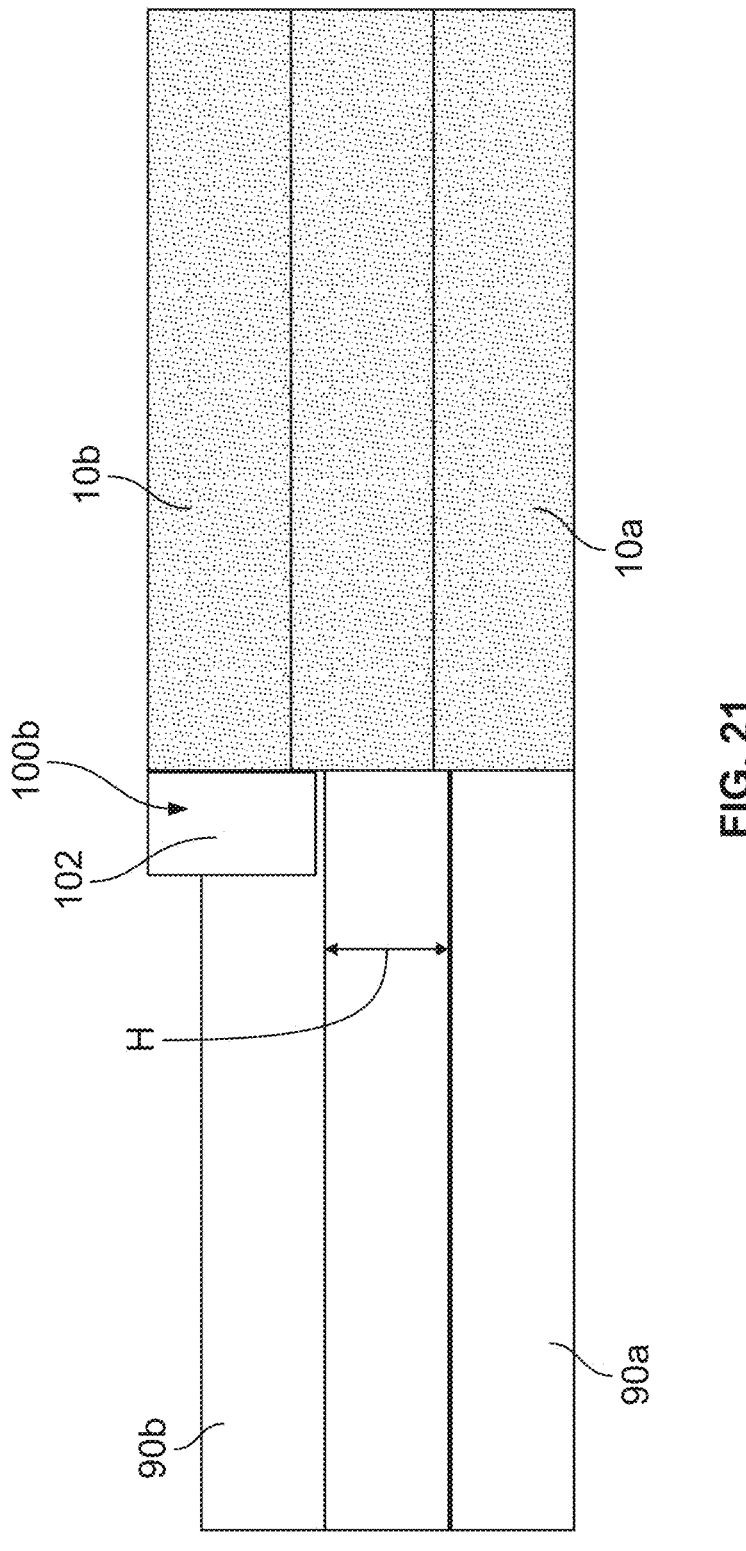

In some embodiments, an installer compares where the height H of the reveal portion 94 of the second roofing shingle 90b is vertically relative to the stack of the step flap 100b using imaginary axis A as a guide. Referring to FIG. 21, in some embodiments, the first edge 96 (e.g., right side edge) of the second roofing shingle 90b is inserted between selected layers of the step flap 100b so that no layer thereof overlays the reveal portion 94 of the second roofing shingle 90b. For example, in some embodiments, as shown in FIG. 21, the first edge 96 of the second roofing shingle 90b overlays the second layer 104 of the step flap 100b and is between the second layer 104 of the step flap 100b and the first layer 102 of the step flap 100b, such that the first layer 102 of the step flap 100b overlays the headlap portion 92 of the second roofing shingle 90b but does not overlay the reveal portion 94 of the second roofing shingle 90b. In some embodiments, installation of additional photovoltaic modules 10 and roofing shingles 90 upward vertically and the interweaving between the roofing shingles 90 and the layers 102, 104 of the steps flaps 100 may occur and the interweaving pattern may repeated or may be different, depending upon the heights H of the reveal portions 94 of the roofing shingles 90.

In some embodiments, it is understood that the installation of the roofing shingles 90 on an opposite (e.g., right side) of the array of the photovoltaic modules 10, a corresponding installation of the steps flaps 100 on such opposite side, and a corresponding interweaving between the roofing shingles 90 and the layers 102, 104 of the steps flaps 100 on such opposite side may be contemplated and desired, and that such installation method would be similar to that as described above, but mirroring same in appropriate instances.

In some embodiments, the system and method of installation of the plurality of step flaps 100 described above and illustrated in FIGS. 17 through 21 is conducted with a roofing system including a first plurality of the roofing shingles 90 and a second plurality of the roofing shingles 90, with the first plurality of roofing shingles 90 being installed on the roof deck 72 in place of the photovoltaic modules 10 as described. That is, in some embodiments, the aforedescribed system and method with the step flaps 100 can be utilized with and include the first plurality of roofing shingles 90 and the second plurality of roofing shingles 90. In some embodiments, the first plurality of roofing shingles 90 is arranged in a first array on the roof deck 72 and overlay the corresponding one or more of the plurality of step flaps 100 and the second plurality of roofing shingles 90 is arranged in a second array on the roof deck 72 and overlay the corresponding one or more of the plurality of step flaps 100 as described above and illustrated in the Figures.

In some embodiments, the first plurality of roofing shingles 90 is polymer shingles and the second plurality of roofing shingles 90 is metal shingles. In some embodiments, the first plurality of roofing shingles 90 is polymer shingles and the second plurality of roofing shingles 90 is polymer shingles. In some embodiments, the first plurality of roofing shingles 90 is polymer shingles and the second plurality of roofing shingles 90 is asphalt shingles. In some embodiments, the first plurality of roofing shingles 90 is asphalt shingles and the second plurality of roofing shingles 90 is asphalt shingles. In some embodiments, the first plurality of roofing shingles 90 is asphalt shingles and the second plurality of roofing shingles 90 is metal shingles. In some embodiments, the first plurality of roofing shingles 90 is metal shingles and the second plurality of roofing shingles 90 is metal shingles.

In some embodiments, the first plurality of roofing shingles 90 is non-asphaltic shingles and the second plurality of roofing shingles 90 is non-asphaltic shingles. In some embodiments, the first plurality of roofing shingles 90 is non-asphaltic shingles and the second plurality of roofing shingles 90 is polymer shingles. In some embodiments, the first plurality of roofing shingles 90 is non-asphaltic shingles and the second plurality of roofing shingles 90 is asphalt shingles. In some embodiments, the first plurality of roofing shingles 90 is non-asphaltic shingles and the second plurality of roofing shingles 90 is metal shingles.

In some embodiments, the first plurality of roofing shingles 90 is recycled asphalt shingles and the second plurality of roofing shingles 90 is recycled asphalt shingles. In some embodiments, the first plurality of roofing shingles 90 is recycled asphalt shingles and the second plurality of roofing shingles 90 is polymer shingles. In some embodiments, the first plurality of roofing shingles 90 is recycled asphalt shingles and the second plurality of roofing shingles 90 is asphalt shingles. In some embodiments, the first plurality of roofing shingles 90 is recycled asphalt shingles and the second plurality of roofing shingles 90 is metal shingles.

In some embodiments, the system and method of installation of the plurality of step flaps 100 described above and illustrated in FIGS. 17 through 21 is conducted with a roofing system including a first plurality of the photovoltaic modules 10 and a second plurality of the photovoltaic modules 10, with the second plurality of photovoltaic modules 10 being installed on the roof deck 72 in place of the roofing shingles 90 as described. That is, in some embodiments, the aforedescribed system and method with the step flaps 100 can be utilized with and include the first plurality of photovoltaic modules 10 and the second plurality of photovoltaic modules 10. In some embodiments, the first plurality of photovoltaic modules 10 is arranged in a first array on the roof deck 72 and overlay the corresponding one or more of the plurality of step flaps 100 and the second plurality of photovoltaic modules 10 is arranged in a second array on the roof deck 72 and overlay the corresponding one or more of the plurality of step flaps 100 as described above and illustrated in the Figures.

In some embodiments, a method includes installing a plurality of the step flaps 100 on the roof deck 72; installing a plurality of the photovoltaic modules 10 on the roof deck 72, wherein an end of each photovoltaic module 10 overlays a portion of a corresponding one of the plurality of step flaps 100; and installing a plurality of roofing shingles 90 on the roof deck 72, wherein an end of a first roofing shingle 90 of the plurality of roofing shingles 90 overlays a first step flap 100 of the plurality of step flaps 100, wherein the installing a plurality of step flaps 100 includes installing a second step flap 100 of the plurality of step flaps 100 vertically above the first step flap 100 such that the second layer 104 of the second step flap 100 overlays the headlap portion of the first roofing shingle 90 but does not overlay the reveal portion of the first roofing shingle 90.

What is claimed is:

1. A system, comprising:

a plurality of photovoltaic modules installed on a roof deck;

a plurality of step flaps installed on the roof deck,
   wherein each of the plurality of step flaps includes a first layer and a second layer,
   wherein the first layer has a first edge, a second edge opposite the first edge, an upper edge extending from the first edge to the second edge, and a lower edge opposite the upper edge and extending from the first edge to the second edge,
   wherein the second layer has a first edge, a second edge opposite the first edge of the second layer, an upper edge extending from the first edge of the second layer to the second edge of the second layer, and a lower edge opposite the upper edge of the second layer and extending from the first edge of the second layer to the second edge of the second layer,
   wherein the first layer overlays a portion of the second layer,
   wherein the lower edge of the first layer is offset from the lower edge of the second layer, and
   wherein the first layer is attached to at least a portion of an overlapping portion of the second layer within an attachment area, wherein an end of each of the plurality of photovoltaic modules overlays a portion of a corresponding one of the plurality of step flaps; and a plurality of roofing shingles installed on the roof deck, wherein each of the plurality of roofing shingles includes a headlap portion and a reveal portion, wherein each of the headlap portion and the reveal portion extend along the roof deck, wherein an end of a first roofing shingle of the plurality of roofing shingles overlays a first one of the plurality of step flaps, and wherein the second layer of a second one of the plurality of step flaps vertically above the first one of the plurality of step flaps overlays the headlap portion of the first roofing shingle but does not overlay the reveal portion of the first roofing shingle.

2. The system of claim 1, wherein at least one of the first layer and the second layer of each of the plurality of step flaps is composed of a polymer, and wherein the polymer is one or more of thermoplastic polyolefin (TPO), polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyimide, polyvinyl chloride (PVC), ethylene propylene diene monomer (EPDM) rubber, silicone rubber, and fluoropolymers.

3. The system of claim 1, wherein at least one of the first layer and the second layer of each of the plurality of step flaps is composed of a metal.

4. The system of claim 1, wherein at least one of the first layer and the second layer of each of the plurality of step flaps is composed of asphalt, recycled asphalt, or a non-asphaltic material.

5. The system of claim 1, wherein the attachment area extends from a first location between the first edge of the second layer and the second edge of the second layer, a second location opposite the first location and between the first edge of the first edge of the second layer and the second edge of the second layer, a third location between the upper edge of the second layer and lower edge of the second layer, and a fourth location opposite the third location and between the upper edge of the second layer and the lower edge of the second layer, and wherein the fourth location is proximate to the lower edge of the first layer.

6. The system of claim 1, wherein the first layer is attached to the second layer by an adhesive, adhesive strip, dots, tape, welding, heat welding, ultrasonic welding, thermal bonding, or a mechanical fastener.

7. The system of claim 1, wherein the first layer of each of the plurality of step flaps includes at least two alignment marks configured to assist in aligning the plurality of photovoltaic modules and the plurality of roofing shingles with the plurality of step flaps.

8. The system of claim 7, wherein the attachment area is between the at least two alignment marks.

9. The system of claim 5, wherein the second layer of each of the plurality of step flaps includes at least two alignment marks configured to assist in aligning the plurality of photovoltaic modules and the plurality of roofing shingles with the plurality of step flaps.

10. The system of claim 9, wherein each of the plurality of step flaps has a first width defined as a first distance from the first edge of the second layer of the step flap to a first one of the at least two alignment marks, and a second width defined as a second distance from the second edge of the second layer of the step flap to a second one of the at least two alignment marks, and wherein the first width and the second width are symmetrical.

11. The system of claim 1, wherein each of the plurality of step flaps includes a removable release liner between the first layer and the second layer.

12. The system of claim 1, wherein each of the plurality of step flaps includes a third layer, wherein the third layer overlays a portion of the second layer, and wherein the second layer is attached to at least a portion of an overlapping portion of the third layer at a second attachment area.

13. The system of claim 1, wherein each of the plurality of roofing shingles is an asphalt shingle, a recycled asphalt shingle, a polymer shingle, metal shingle, a non-asphaltic shingle, and an electrically inactive solar shingle.

14. The system of claim 1, wherein the first layer or the second layer of each of the plurality of step flaps includes a fire retardant additive.

15. The system of claim 1, wherein the plurality of photovoltaic modules is arranged in an array including one or more subarrays, each subarray including a plurality of rows of photovoltaic modules.

16. The system of claim 1, wherein at least one of the first layer or the second layer of each of the plurality of step flaps has a thickness of 0.1 mm to 5 mm.

17. A system, comprising:
a plurality of photovoltaic modules installed on a roof deck;
a plurality of step flaps installed on the roof deck, wherein each of the plurality of step flaps includes a first layer and a second layer,
wherein the first layer overlays a portion of the second layer, and
wherein the first layer is attached to at least a portion of an overlapping portion of the second layer within an attachment area,
wherein each of the plurality of step flaps includes a removable release liner between the first layer and the second layer,
wherein an end of each of the plurality of photovoltaic modules overlays a portion of a corresponding one of the plurality of step flaps; and
a plurality of roofing shingles installed on the roof deck, wherein each of the plurality of roofing shingles includes a headlap portion and a reveal portion, wherein each of the headlap portion and the reveal portion extend along the roof deck,
wherein an end of a first roofing shingle of the plurality of roofing shingles overlays a first one of the plurality of step flaps, and
wherein the second layer of a second one of the plurality of step flaps vertically above the first one of the plurality of step flaps overlays the headlap portion of the first roofing shingle but does not overlay the reveal portion of the first roofing shingle.

18. A system, comprising:
a plurality of photovoltaic modules installed on a roof deck;
a plurality of step flaps installed on the roof deck, wherein each of the plurality of step flaps includes a first layer, a second layer, and a third layer,
wherein the first layer overlays a portion of the second layer, and
wherein the first layer is attached to at least a portion of an overlapping portion of the second layer within an attachment area,
wherein the third layer overlays a portion of the second layer, wherein the second layer is attached to at least a portion of an overlapping portion of the third layer at a second attachment area, wherein an end of each of the plurality of photovoltaic modules overlays a portion of a corresponding one of the plurality of step flaps; and a plurality of roofing shingles installed on the roof deck, wherein each of the plurality of roofing shingles includes a headlap portion and a reveal portion, wherein each of the headlap portion and the reveal portion extend along the roof deck, wherein an end of a first roofing shingle of the plurality of roofing shingles overlays a first one of the plurality of step flaps, and wherein the second layer of a second one of the plurality of step flaps vertically above the first one of the plurality of step flaps overlays the headlap portion of the first roofing shingle but does not overlay the reveal portion of the first roofing shingle.

* * * * *